(12) United States Patent
Kim et al.

(10) Patent No.: US 11,368,930 B2
(45) Date of Patent: Jun. 21, 2022

(54) OPERATION METHOD OF TERMINAL AND BASE STATION IN WIRELESS COMMUNICATION SYSTEM SUPPORTING UNLICENSED BAND, AND APPARATUS SUPPORTING SAME

(71) Applicant: LG Electronics Inc., Seoul (KR)

(72) Inventors: Seonwook Kim, Seoul (KR); Hyunsoo Ko, Seoul (KR); Changhwan Park, Seoul (KR); Suckchel Yang, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/028,392

(22) Filed: Sep. 22, 2020

(65) Prior Publication Data

US 2021/0007068 A1    Jan. 7, 2021

Related U.S. Application Data

(63) Continuation of application No. 16/879,372, filed on May 20, 2020, now Pat. No. 10,912,050, which is a
(Continued)

(30) Foreign Application Priority Data

Aug. 9, 2018   (KR) .................. 10-2018-0092816
Jan. 10, 2019  (KR) .................. 10-2019-0003565
(Continued)

(51) Int. Cl.
*H04W 4/00*      (2018.01)
*H04W 56/00*     (2009.01)
(Continued)

(52) U.S. Cl.
CPC ......... *H04W 56/001* (2013.01); *H04L 5/0048* (2013.01); *H04W 72/0446* (2013.01); *H04W 76/28* (2018.02)

(58) Field of Classification Search
CPC .............. H04W 56/001; H04W 76/28; H04W 72/0446; H04W 16/14; H04W 48/10;
(Continued)

(56) References Cited

U.S. PATENT DOCUMENTS

2017/0311250 A1 * 10/2017 Rico Alvarino ........ H04W 4/70
2018/0205507 A1 *  7/2018 John Wilson ......... H04L 5/0051
(Continued)

FOREIGN PATENT DOCUMENTS

| KR | 101340636     | 12/2013 |
| KR | 1020180053081 | 5/2018  |
| WO | WO2017132479  | 8/2017  |

OTHER PUBLICATIONS

Ericsson, "On NR-PBCH," R1-1800893, 3GPP TSG RAN WG1 Meeting AH 1801, Vancouver, Canada, dated Jan. 22-26, 2018, 4 pages.
(Continued)

*Primary Examiner* — Mang Hang Yeung
(74) *Attorney, Agent, or Firm* — Fish & Richardson P.C.

(57) ABSTRACT

The present disclosure provides an operation method of a terminal and a base station in a wireless communication system supporting an unlicensed band, and an apparatus supporting same. As a specific example, the present disclosure comprises an operation method of a terminal and an operation method of a base station corresponding thereto, by which a terminal can obtain timing information relating to a unlicensed band on the basis of a PBCH payload in a
(Continued)

synchronization signal/physical broadcast channel (SS/PBCH) block and a demodulation reference signal (DMRS) sequence for the PBCH.

17 Claims, 36 Drawing Sheets

Related U.S. Application Data continuation of application No. PCT/KR2019/010082, filed on Aug. 9, 2019.

(30) Foreign Application Priority Data

| | | |
|---|---|---|
| Jan. 21, 2019 | (KR) | 10-2019-0007444 |
| Feb. 15, 2019 | (KR) | 10-2019-0018198 |
| Mar. 28, 2019 | (KR) | 10-2019-0035573 |
| May 2, 2019 | (KR) | 10-2019-0051552 |

(51) Int. Cl.
*H04W 76/28* (2018.01)
*H04L 5/00* (2006.01)
*H04W 72/04* (2009.01)

(58) Field of Classification Search
CPC . H04W 48/08; H04W 56/00; H04W 74/0808; H04W 74/002; H04L 5/0048; H04L 5/001; H04L 5/0051; H04L 5/0007; H04L 5/0044; H04J 11/00; H04J 11/0069; Y02D 30/70
USPC .......................................................... 370/329
See application file for complete search history.

(56) References Cited

U.S. PATENT DOCUMENTS

| | | | |
|---|---|---|---|
| 2019/0327696 A1* | 10/2019 | Oh | H04W 56/001 |
| 2020/0067755 A1* | 2/2020 | Pan | H04W 56/0015 |
| 2020/0068420 A1* | 2/2020 | Chen | H04W 48/12 |
| 2020/0119965 A1* | 4/2020 | Harada | H04W 72/04 |
| 2020/0153672 A1* | 5/2020 | Choi | H04L 5/0048 |

OTHER PUBLICATIONS

Huawei, Initial access in NR unlicensed (R1-1805920), May 2018 (Year: 2018).
LG Electronics, "Discussion on NR-PBCH design and time index indication method," R1-1713124, 3GPP TSG RAN WG1 Meeting #90, Prague, Czech Republic, dated Aug. 21-25, 2017, 14 pages.
LG Electronics, "NR PBCH Design," R1-1700460, 3GPP TSG RAN WG1 NR Ad-Hoc Meeting, Spokane, USA, dated Jan. 16-20, 2017, 10 pages.
LG, Consideration on NR-PBCH contents and payload size (R1-1710262), Jun. 2017 (Year: 2017).
NTT DOCOMO, INC., "Discussion on NR-PBCH design," R1-1702827, 3GPP TSG RAN WG1 Meeting #88, Athens, Greece, dated Feb. 13-17, 2017, 7 pages.
PCT International Search Report in International Application No. PCT/KR2019/010082, dated Nov. 25, 2019, 22 pages (with English translation).
Qualcomm, Timing indication based on SS block consideration (R1-1711646), Jun. 2017 (Year: 2017).

* cited by examiner

Carrier aggregation between L-band and U-band

Standalone U-band(s)

FIG. 27

OPERATION METHOD OF TERMINAL AND BASE STATION IN WIRELESS COMMUNICATION SYSTEM SUPPORTING UNLICENSED BAND, AND APPARATUS SUPPORTING SAME

CROSS-REFERENCE TO RELATED APPLICATIONS

This application is a continuation of U.S. application Ser. No. 16/879,372, filed on May 20, 2020, now allowed, which is a continuation of International Application No. PCT/KR2019/010082, filed on Aug. 9, 2019, which claims priority under 35 U.S.C. 119(a) to Korean Patent Application Nos. 10-2018-0092816, filed on Aug. 9, 2018, 10-2019-0003565, filed on Jan. 10, 2019, 10-2019-0007444, filed on Jan. 21, 2019, 10-2019-0018198, filed on Feb. 15, 2019, 10-2019-0035573, filed on Mar. 28, 2019, and 10-2019-0051552, filed on May 2, 2019. The disclosures of the prior applications are incorporated by reference in their entirety.

TECHNICAL FIELD

The present disclosure relates to a wireless communication system, and more particularly, to a method and apparatus for operating a user equipment (UE) and a base station (BS) in a wireless communication system supporting an unlicensed band.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed, and various technical configurations for them are proposed.

SUMMARY

Provided are a method and apparatus for operating a user equipment (UE) and a base station (BS) in a wireless communication system supporting an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for operating a user equipment (UE) and a base station (BS) in a wireless communication system supporting an unlicensed band.

According to one aspect of the present disclosure, a method of operating a UE in a wireless communication system supporting an unlicensed band includes receiving a synchronization signal (SS)/physical broadcast channel (PBCH) block in the unlicensed band. The SS/PBCH block includes a primary synchronization signal (PSS), a secondary synchronization signal (SSS), and a PBCH, timing information for the unlicensed band is acquired based on PBCH payload included in the PBCH and a demodulation reference signal (DMRS) sequence for the PBCH, and a size of the PBCH payload used to acquire the timing information for the unlicensed band is determined based on a numerology applied to the unlicensed band.

In the present disclosure, the timing information for the unlicensed band may include information about at least one of (i) a frame boundary for the unlicensed band, (ii) a slot boundary for the unlicensed band, (iii) a frame index for the unlicensed band, or (iv) a slot index for the unlicensed band.

For example, the size of the PBCH payload used to acquire the timing information for the unlicensed band may be set to one bit based on a first numerology corresponding to a subcarrier spacing (SCS) of 15 kHz being applied to the unlicensed band.

In another example, the size of the PBCH payload used to acquire the timing information for the unlicensed band may be set to two bits based on a second numerology corresponding to an SCS of 30 kHz being applied to the unlicensed band.

The number of candidate positions available for transmission of the SS/PBCH block based on the second numerology being applied to the unlicensed band may be set to twice the number of candidate positions available for transmission of the SS/PBCH block based on the first numerology being applied to the unlicensed band.

Further, a time duration in which candidate positions available for transmission of the SS/PBCH block are configured may be set irrespective of a numerology applied to the unlicensed band.

In the present disclosure, the DMRS sequence for the PBCH may be configured to be associated with one of (i) an index of the received SS/PBCH block or (ii) information about a transmission position of the received SS/PBCH block (e.g., an SS?PBCH block transmission candidate index or the like).

In the present disclosure, the UE may detect related DMRS sequence information by blind-detecting the DMRS sequence for the PBCH. Subsequently, the UE may decode the PBCH payload in the SS/PBCH block based on the DMRS sequence information.

In the present disclosure, the method of operating a UE may further include performing initial access to a base station (BS) based on (i) the acquired timing information and (ii) the received SS/PBCH block.

In the present disclosure, the SS/PBCH block may be received at one of a plurality of candidate positions available for transmission of the SS/PBCH block in the unlicensed band.

According to another aspect of the present disclosure, a UE operating in a wireless communication system supporting an unlicensed band includes at least one radio frequency (RF) module, at least one processor, and at least one memory operably coupled to the at least one processor and storing instructions which, when executed, cause the at least one processor to perform a specific operation. The specific operation includes receiving an SS/PBCH block in the unlicensed band. The SS/PBCH block includes a PSS, an SSS, and a PBCH, timing information for the unlicensed band is acquired based on PBCH payload included in the PBCH and a DMRS sequence for the PBCH, and a size of the PBCH payload used to acquire the timing information for the unlicensed band is determined based on a numerology applied to the unlicensed band.

The UE may communicate with at least one of a mobile terminal, a network, or an autonomous driving vehicle other than a vehicle including the UE.

According to another aspect of the present disclosure, a BS operating in a wireless communication system supporting an unlicensed band includes at least one RF module, at least one processor, and at least one memory operably coupled to the at least one processor and storing instructions which, when executed, cause the at least one processor to perform a specific operation. The specific operation includes performing a channel access procedure (CAP) for transmission of an SS/PBCH block in the unlicensed band, and transmitting the SS/PBCH block to the UE in the unlicensed band based on the CAP. The SS/PBCH block includes a PSS, an SSS, and a PBCH, timing information for the unlicensed band is acquired based on PBCH payload included in the PBCH and a DMRS sequence for the PBCH, and a size of the PBCH payload used to acquire the timing information for the unlicensed band is determined based on a numerology applied to the unlicensed band.

The BS may transmit the SS/PBCH block to the UE at one of a plurality of candidate positions available for transmission of the SS/PBCH block in the unlicensed band based on the CAP.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

In view of the nature of an unlicensed band, a BS may fail in always transmitting a synchronization signal block (SSB) (or synchronization signal (SS)/physical broadcast channel (PBCH) block) at a specific time to a UE. This is because when the BS fails in occupying the unlicensed band at the specific time, the BS does not transmit the SSB.

According to the present disclosure, the UE may acquire timing information for the unlicensed band based on acquired PBCH payload and DMRS sequence for a PBCH in consideration of the above characteristic of the unlicensed band. The size of the PBCH payload used to acquire the timing information for the unlicensed band may be determined/configured differently based on a numerology applied to the unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 27 is a simplified diagram illustrating the configuration of an SSB transmitted in a licensed band in an NR system.

DETAILED DESCRIPTION

Figure 1:
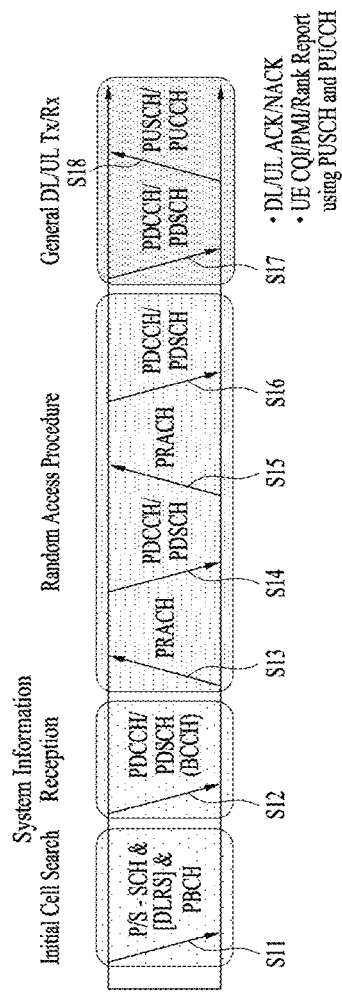
FIG. 1 is a diagram illustrating physical channels and a signal transmission method using the physical channels according to embodiments of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (W-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters anew cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2A:
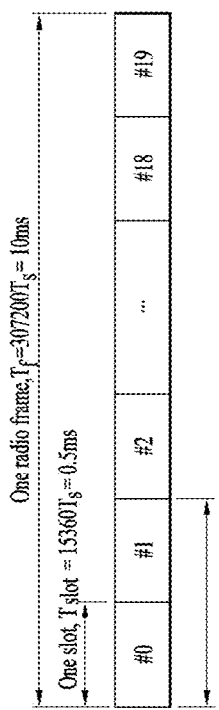
FIGS. 2A to 3 are diagrams illustrating radio frame structures in a long term evolution (LTE) system to which embodiments of the present disclosure are applicable.
Figure 2B:
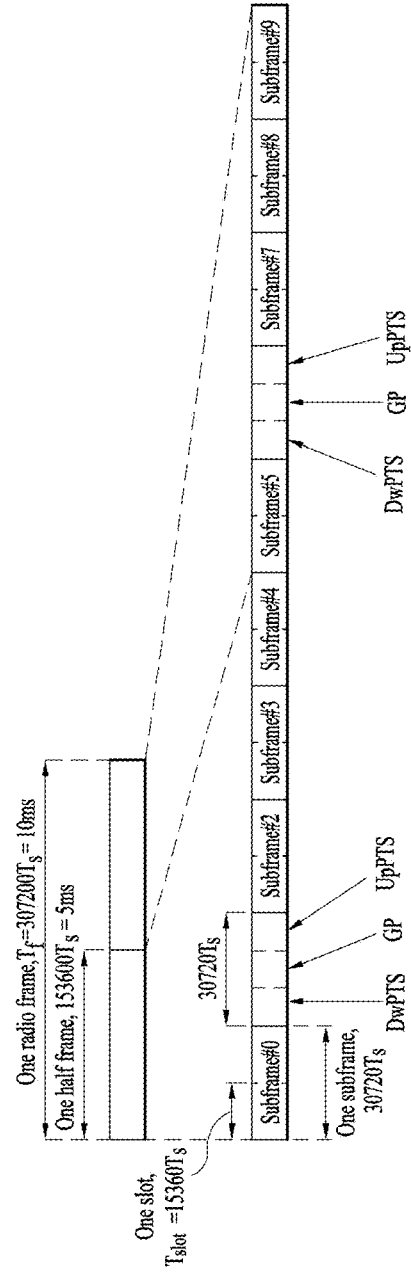
Figure 3:
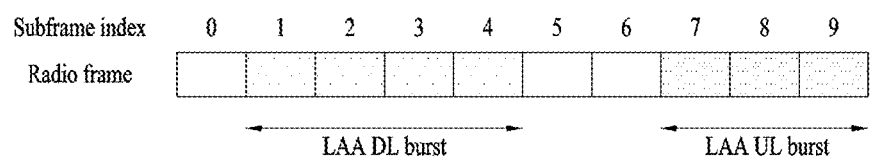

FIGS. 2A to 3 are diagrams illustrating radio frame structures in an LTE system to which embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2A illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |

TABLE 1-continued

| Subslot number | 0 | 1 | 2 | 3 | 4 | 5 |
|---|---|---|---|---|---|---|
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2B illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe issued for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
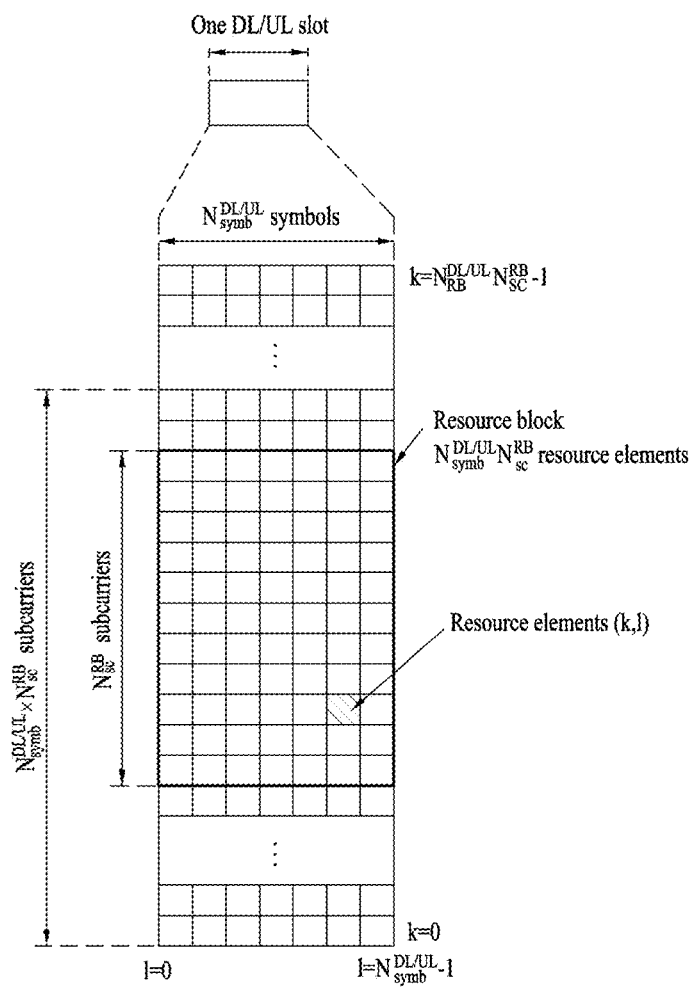
FIG. 4 is a diagram illustrating a slot structure in the LTE system to which the embodiments of the present disclosure are applicable.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/UL}_{RB} N^{RB}_{sc}$ subcarriers and $N^{DL/UL}_{symb}$ symbols. $N^{DL}_{RB}$ represents the number of RBs in

TABLE 3

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + χ) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to an SCS and a CP length (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot. k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 5:
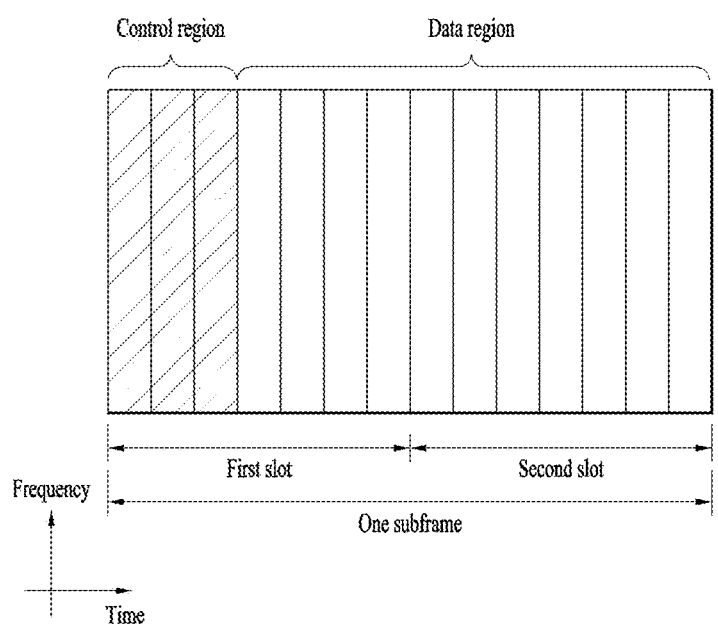
FIG. 5 is a diagram illustrating a downlink subframe structure in the LTE system to which the embodiments of the present disclosure are applicable.

FIG. 5 illustrates a DL subframe structure in an LTE system to which embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

Figure 6:
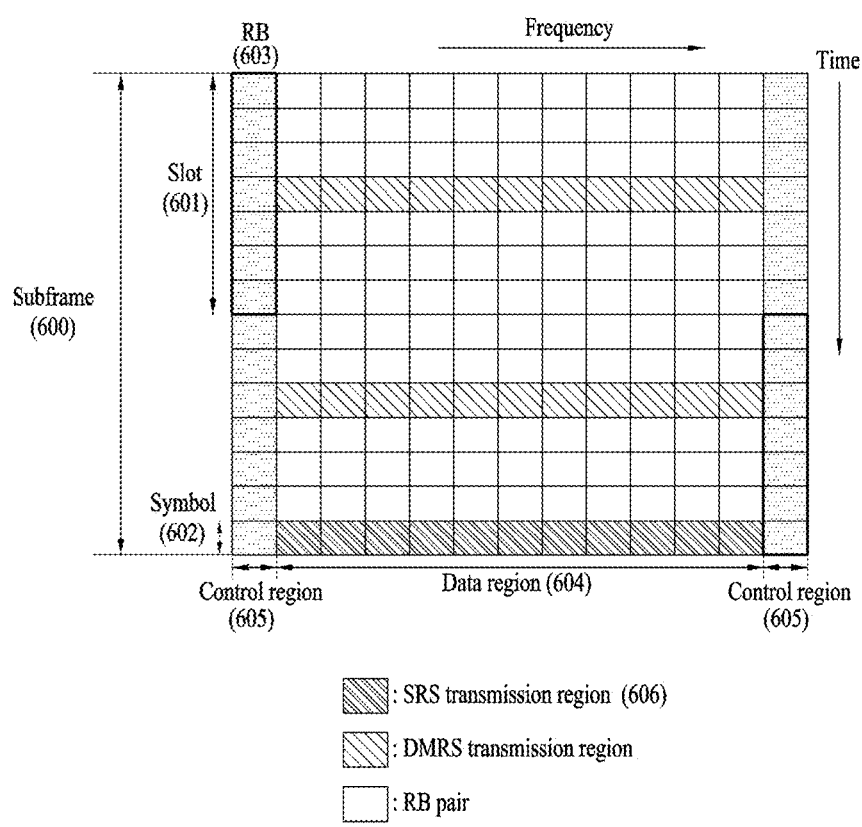
FIG. 6 is a diagram illustrating an uplink subframe structure in the LTE system to which the embodiments of the present disclosure are applicable.

FIG. 6 is a diagram illustrating a UL subframe structure in an LTE system to which embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a control region 604 and a data region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 7:
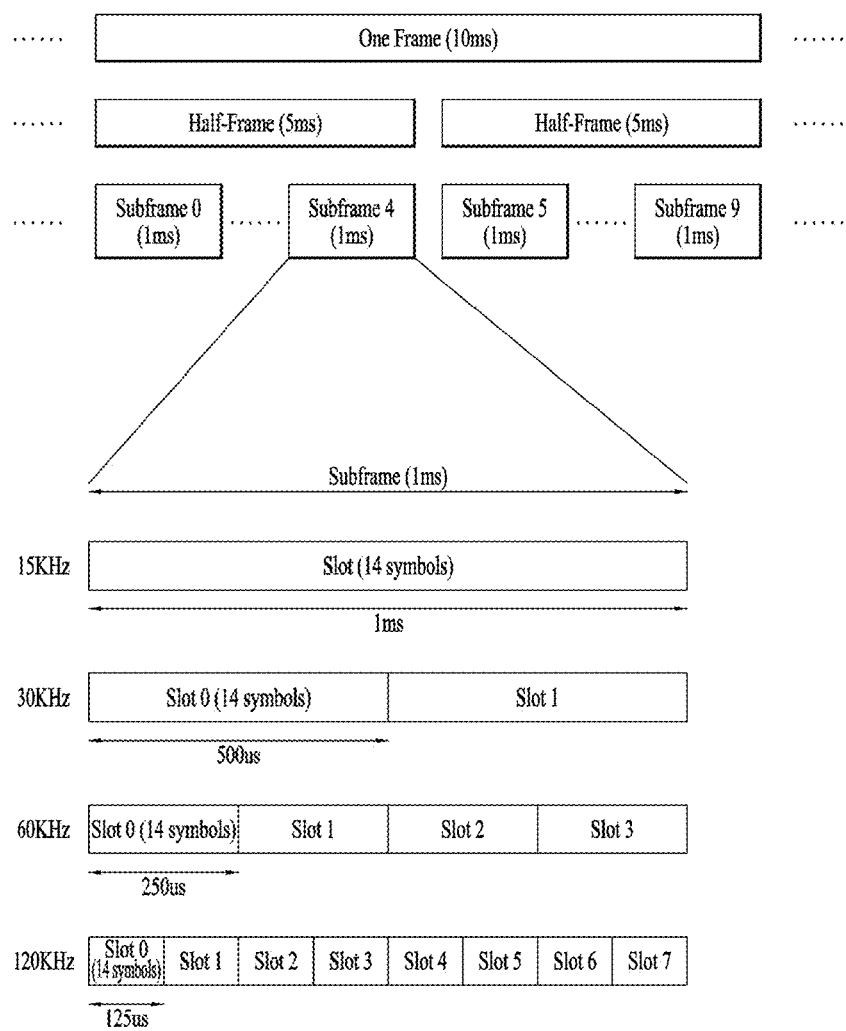
FIG. 7 is a diagram illustrating a radio frame structure in a new radio access technology (NR) system to which embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 7. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 8:
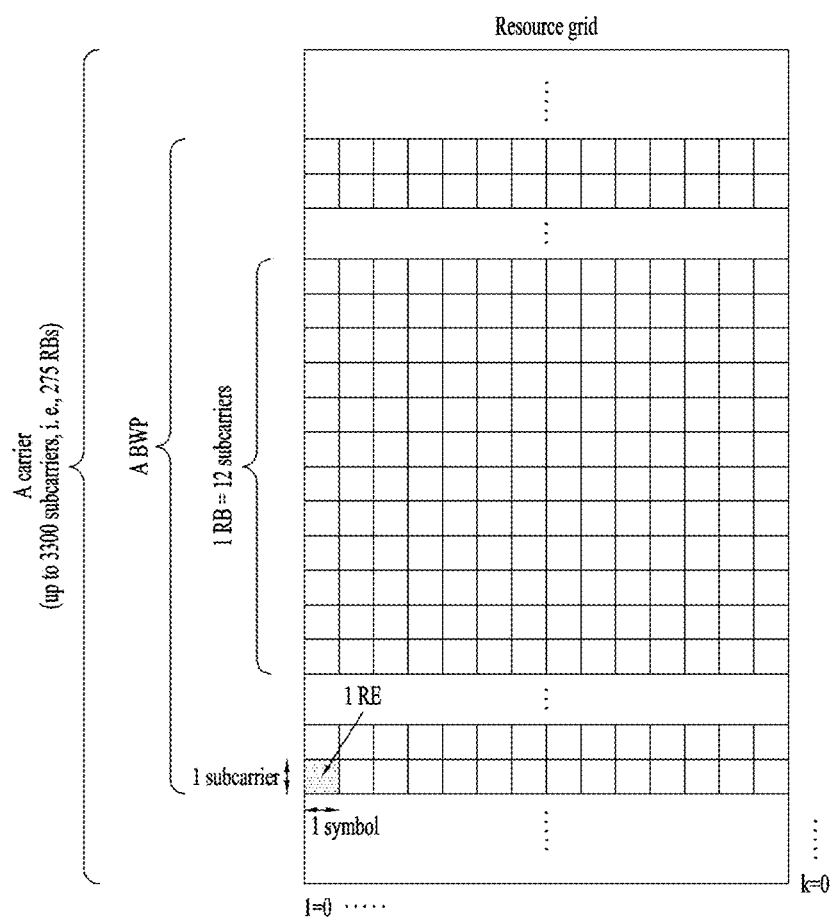
FIG. 8 is a diagram illustrating a slot structure in the NR system to which the embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
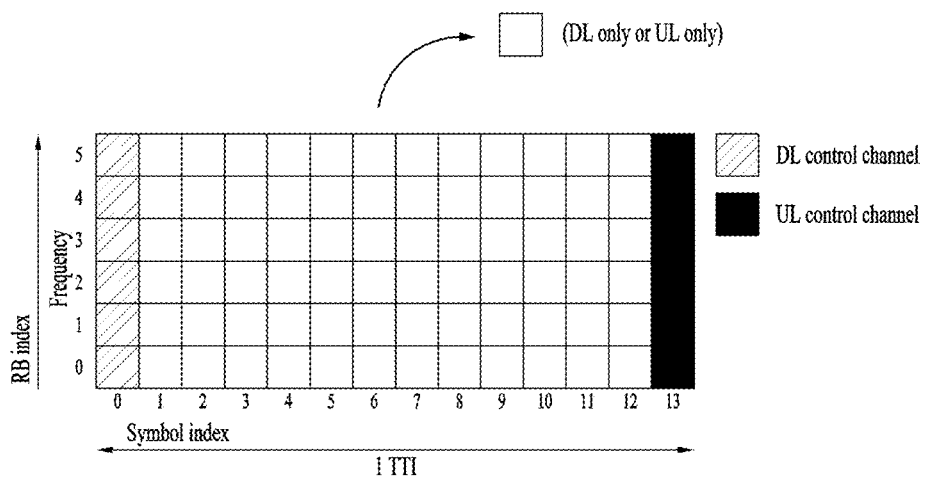
FIG. 9 is a diagram illustrating a self-contained slot structure in the NR system to which the embodiments of the present disclosure are applicable.

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
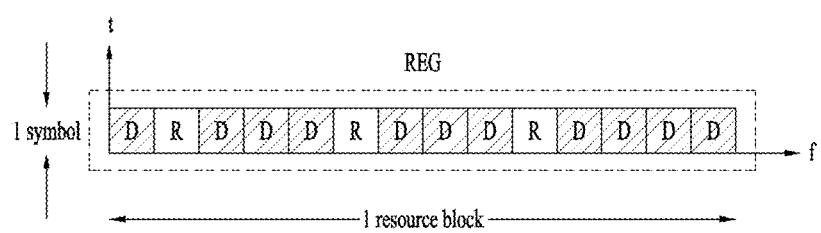
FIG. 10 is a diagram illustrating a resource element group (REG) structure in the NR system to which the embodiments of the present disclosure are applicable.

FIG. 10 is a diagram illustrating the structure of one REG in an NR system to which embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 6 lists exemplary PUCCH formats.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 11:
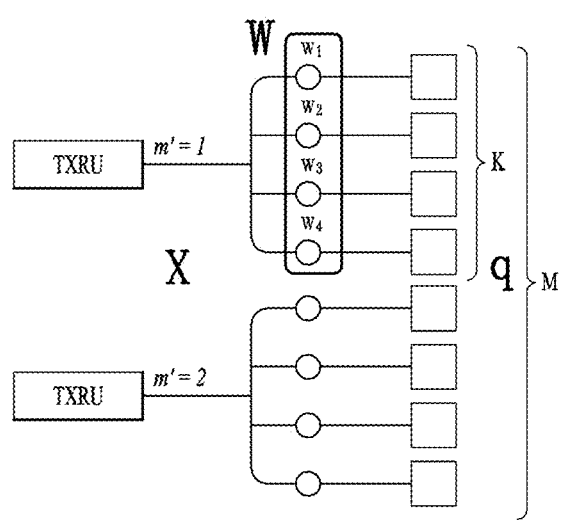
FIGS. 11 and 12 are diagrams illustrating representative methods of connecting transceiver units (TXRUs) to antenna elements.
Figure 12:
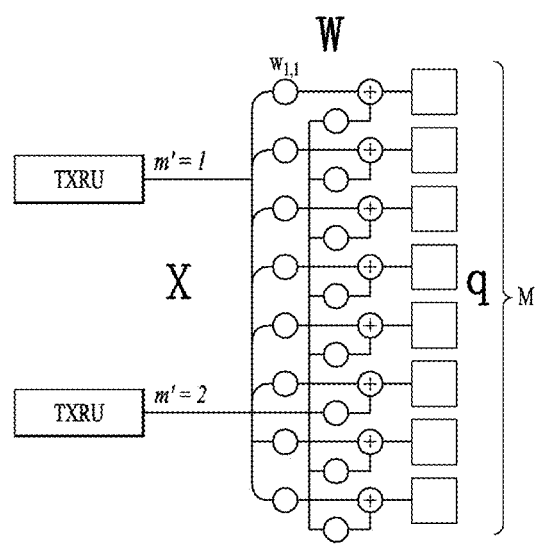

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to sub-arrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 13:
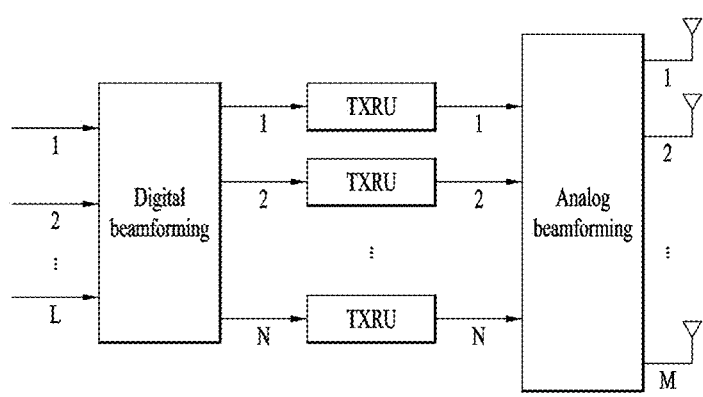
FIG. 13 is a schematic diagram illustrating a hybrid beamforming structure from the perspective of TXRUs and physical antennas according to an example of the present disclosure.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 14:
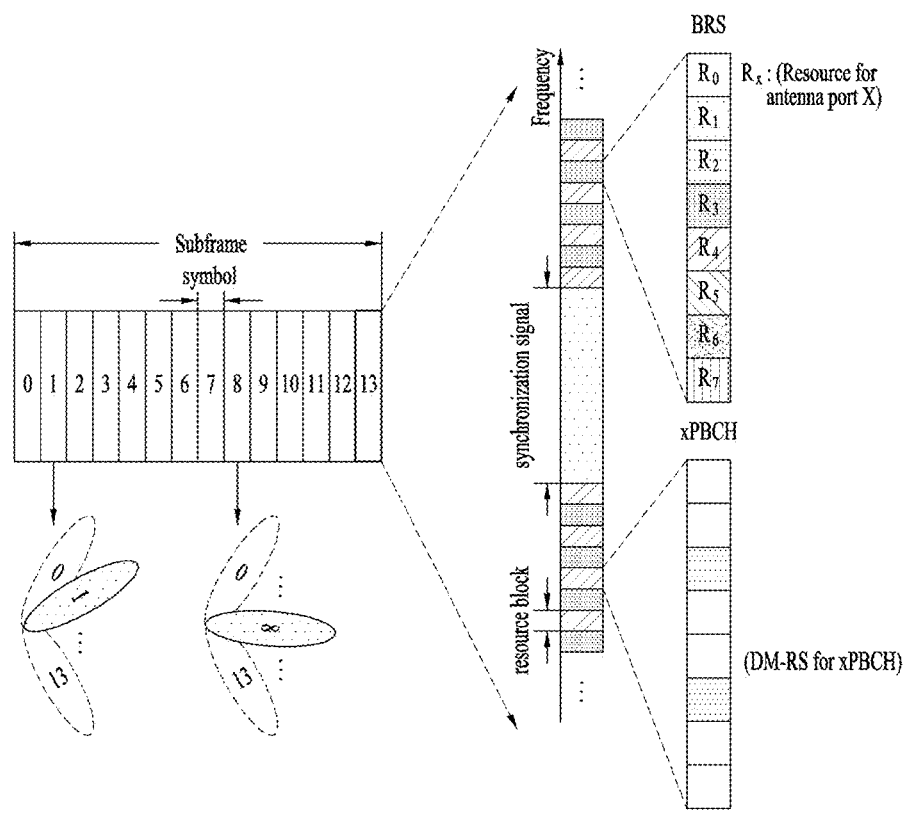
FIG. 14 is a schematic diagram illustrating a beam sweeping operation for a synchronization signal and system information in a downlink transmission procedure according to an example of the present disclosure.

FIG. 14 is a diagram schematically illustrating an exemplary beam sweeping operation for a synchronization signal and system information in a DL transmission procedure according to the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 15:
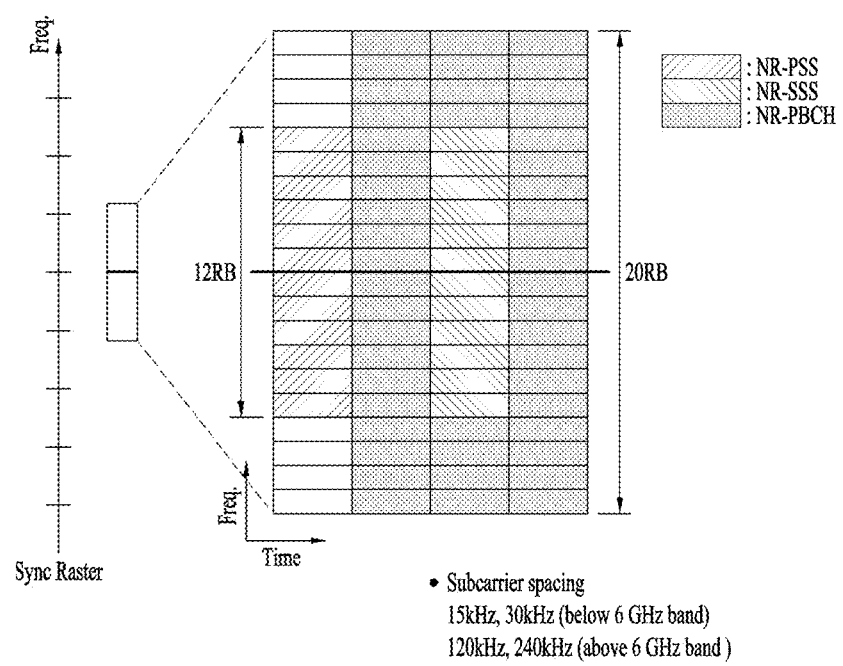
FIG. 15 is a schematic diagram illustrating a synchronization signal/physical broadcast channel (SS/PBCH) block applicable to the present disclosure.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 16:
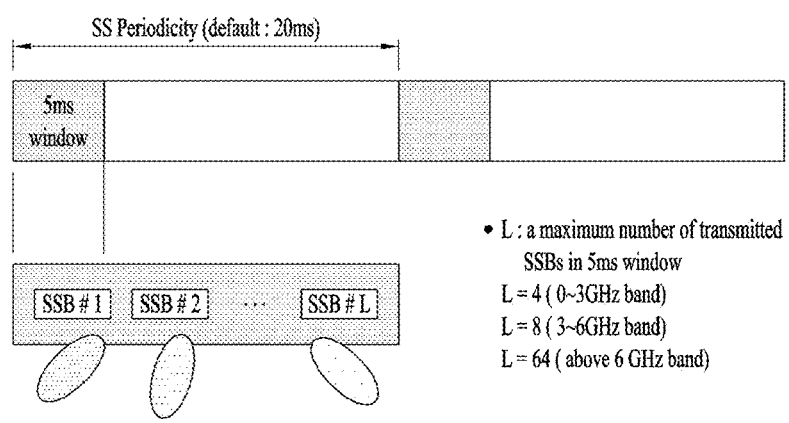
FIG. 16 is a schematic diagram illustrating a SS/PBCH block transmission configuration applicable to the present disclosure.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH contents-based (e.g., MIB-based) timing detection.

For this purpose, the UE may assume that reception occasions for the PBCH, the PSS, and the SSS exist in consecutive symbols (i.e., the UE may assume that an SS/PBCH block is made up of the PBCH, the PSS, and the SSS, as described before). The UE may also assume that the SSS, a PBCH DMRS, and PBCH data have the same energy per resource element (EPRE). The UE may assume that the ratio of PSS EPRE to SSS EPRE of the SS/PBCH block in a corresponding cell is 0 dB or 3 dB. Alternatively, when the UE is not provided with dedicated higher-layer parameters, the UE, which monitors a PDCCH for DCI format 1_0 with a CRC scrambled with a system information-random network temporary identifier (SI-RNTI), a paging-random network temporary identifier (P-RNTI), or a random access-random network temporary identifier (RA-RNTI), may assume that the ratio of PDCCH EPRE to SSS EPRE is between −8 dB and 8 dB.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

Regarding an SS/PBCH block in a half-frame, the first symbol indexes of candidate SS/PBCH blocks may be determined according to the SCSs of the SS/PBCH blocks. Index #0 corresponds to the first symbol of the first slot in the half-frame.

(Case A: 15-kHz SCS) The first symbols of the candidate SS/PBCH blocks may be symbols $\{2, 8\}+14*n$ where n is 0 or 1 for a frequency band equal to or lower than 3 GHz, and 0, 1, 2 or 3 for a frequency band higher than 3 GHz and equal to or lower than 6 GHz.

(Case B: 30-kHz SCS) The first symbols of the candidate SS/PBCH blocks may be symbols $\{4, 8, 16, 32\}+28*n$ where n is 0 for a frequency band equal to or lower than 3 GHz, and 0 or 1 for a frequency band higher than 3 GHz and equal to or lower than 6 GHz.

(Case C: 30-kHz SCS) The first symbols of the candidate SS/PBCH blocks may be symbols $\{2, 8\}+14*n$ where n is 0 or 1 for a frequency band equal to or lower than 3 GHz, and 0, 1, 2 or 3 for a frequency band higher than 3 GHz and equal to or lower than 6 GHz.

(Case D: 120-kHz SCS) The first symbols of the candidate SS/PBCH blocks may be symbols $\{4, 8, 16, 20\}+28*n$ where n is 0, 1, 2, 3, 5, 6, 7, 8, 19, 11, 12, 13, 15, 16, 17 or 18 for a frequency band above 6 GHz.

(Case E: 240-kHz SCS) The first symbols of the candidate SS/PBCH blocks may be symbols $\{8, 12, 16, 20, 32, 36, 40, 44\}+56*n$ where n is 0, 1, 2, 3, 5, 6, 7 or 8 for a frequency band above 6 GHz.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the BS.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Synchronization Raster

The synchronization raster indicates the frequency position of an SSB which the UE may use to acquire system information, when the SSB is not explicitly signaled. A global synchronization raster is defined for all frequencies. The frequency position of the SSB is defined as $SS_{REF}$ with a corresponding global synchronization channel number (GSCN). Parameters defining $SS_{REF}$ and GSCNs for all the frequency ranges are listed in the following table.

TABLE 7

| Frequency range | SS Block frequency position SSREF | GSCN | Range of GSCN |
|---|---|---|---|
| 0–3000 MHz | N * 1200 kHz + M * 50 kHz, N = 1:2499, M ∈ {1, 3, 5} (Note 1) | 3N + (M − 3)/2 | 2–7498 |
| 3000–24250 MHz | 3000 MHz + N * 1.44 MHz N = 0:14756 | 7499 + N | 7499–22255 |

NOTE 1:
The default value for operating bands with SCS spaced channel raster is M = 3.

Mapping between the synchronization raster and a corresponding RB of the SSB may be based on the following table. The mapping depends on the total number of RBs allocated in the channel and applies to both UL and DL.

TABLE 8

| Resource element index k | 0 |
|---|---|
| Physical resource block number $n_{PRB}$ of the SS block | $n_{PRB}$ = 10 |

1.7. Antenna Ports Quasi Co-Location

A single UE may be configured with a list of up to M transmission configuration indicator (TCI)-state configurations. The up to M TCI-state configurations may be configured by a higher-layer parameter PDSCH-Config (for the UE) to decode a PDSCH according to a detected PDCCH with DCI intended for the UE and a given serving cell, where M depends on a UE capability.

Each TCI-state contains parameters for configuring a quasi co-location (QCL) relationship between one or two DL RSs and DMRS ports of a PDSCH. The QCL relationship is configured based on a higher-layer parameter qcl-Type1 for a first DL RS, and a higher-layer parameter qcl-Type2 for a second DL RS (if configured). For the case of two DL RSs, the QCL types should not be the same, regardless of whether the RSs are the same DL RS or different DL RSs. A QCL type corresponding to each DL RS is given by a higher-layer parameter qcl-Type in a higher-layer parameter QCL-Info and may take one of the following values.

'QCL-TypeA': (Doppler shift, Doppler spread, average delay, delay spread)
'QCL-TypeB': (Doppler shift, Doppler spread)
'QCL-TypeC': (Doppler shift, average delay)
'QCL-TypeD': (Spatial Rx parameter)

The UE receives an activation command used to map up to 8 TCI states to codepoints of a TCI field in the DCI. When an HARQ-ACK signal corresponding to a PDSCH carrying the activation command is transmitted in slot #n, the indicated mapping between the TCI states and the codepoints of the TCI field in the DCI may be applied, starting from slot #(n+3*$N^{subframe, \mu}_{slot}$+1) where $N^{subframe,\mu}_{slot}$ is determined based on Table 4 or Table 5 described before. After the UE receives an initial higher-layer configuration of the TCI states and before the UE receives the activation command, the UE assumes that DMRS port(s) of a PDSCH of a serving cell are QCLed with an SS/PBCH block determined in an initial access procedure with respect to 'QCL-TypeA'. Additionally, at the time, the UE may assume that the DMRS port(s) of the PDSCH of the serving cell are QCLed with the SS/PBCH block determined in the initial access procedure with respect to 'QCL-TypeD'.

If a higher-layer parameter tci-PresentInDCI is set to 'enabled' for a CORESET scheduling the PDSCH, the UE assumes that the TCI field is present in a PDCCH of DCI format 1_1 transmitted on the CORESET. If the higher-layer parameter tci-PresentInDCI is not configured for the CORESET scheduling the PDSCH or the PDSCH is scheduled by DCI format 1_0, and if the offset between the reception time of the DL DCI and the reception time of the corresponding PDSCH is equal to or larger than a threshold Threshold-Sched-Offset (determined based on a reported UE capability), the UE assumes that a TCI state or QCL assumption for the PDSCH is identical to a TCI state or QCL assumption applied to the CORESET used for the PDCCH transmission, to determine PDSCH antenna port QCL.

If the higher-layer parameter tci-PresentInDCI is set to 'enabled', if the TCI field of DCI scheduling a component carrier (CC) indicates TCI states activated in the scheduled CC or a DL BW, and if the PDSCH is scheduled by DCI format 1_1, the UE uses TCI-State based on the value of the TCI field in DCI of the detected PDCCH, for determining PDSCH antenna port QCL. If the time offset between the reception time of the DL DCI and the reception time of the corresponding PDSCH is equal to or larger than a threshold Threshold-Sched-Offset (determined based on a reported UE capability), the UE assumes that DMRS port(s) of a PDSCH of a serving cell are QCLed with RS(s) in the TCI state with respect to QCL type parameter(s) given by the indicated TCI state. If a single-slot PDSCH is configured for the UE, the indicated TCI state should be based on activated TCI states in the slot of the scheduled PDSCH. If a CORE-SET associated with a search space set for cross-carrier scheduling is configured for the UE, the UE assumes that the higher-layer parameter tci-PresentInDCI is set to 'enabled' for the CORESET, and if one or more TCI states configured for a serving cell scheduled by the search space set includes 'QCL-TypeD', the UE expects that the time offset between the reception time of a PDCCH detected in the search space set and the reception time of a corresponding PDSCH is equal to or larger than the threshold Threshold-Sched-Offset.

For both the cases when the higher-layer parameter tci-PresentInDCI is set to 'enabled' and the higher-layer parameter tci-PresentInDCI is not configured in RRC connected mode, if the offset between the reception of the DL DCI and the corresponding PDSCH is less than the threshold Threshold-Sched-Offset, the UE may assume the following. (i) The DMRS ports of a PDSCH of a serving cell are QCLed with the RS(s) in the TCI state with respect to the QCL parameter(s). (ii) The QCL parameter(s) is used for a PDCCH quasi co-location indication of the CORESET associated with a monitored search space with the lowest CORESET-ID in the latest slot in which one or more CORESETs within the active BWP of the serving cell are monitored by the UE.

In this case, if 'QCL-TypeD' of the PDSCH DMRS is different from 'QCL-TypeD' of the PDCCH DMRS overlapped with the PDSCH DMRS in at least one symbol, the UE is expected to prioritize PDCCH reception associated with a corresponding CORESET. This operation may also apply to an intra-band CA case (when a PDSCH and the CORESET are in different CCs). If none of configured TCI states contains 'QCL-TypeD', the UE obtains the other QCL assumptions from the indicated TC states for its scheduled PDSCH irrespective of the time offset between the reception time of the DL DCI and the corresponding PDSCH.

For a periodic CSI-RS resource in a higher-layer parameter NZP-CSI-RS-ResourceSet configured with a higher-layer parameter trs-Info, the UE should assume that a TCI state indicates one of the following QCL type(s):

'QCL-TypeC' for an SS/PBCH block and, when applicable, 'QCL-TypeD' for the same SS/PBCH block, or
'QCL-TypeC' for an SS/PBCH block and, when applicable, 'QCL-TypeD' for a periodic CSI-RS resource in a higher-layer parameter NZP-CSI-RS-ResourceSet configured with a higher layer parameter repetition.

For a CSI-RS resource in the higher-layer parameter NZP-CSI-RS-ResourceSet configured without the higher-layer parameter trs-Info and without the higher-layer parameter repetition, the UE should assume that a TCI state indicates one of the following QCL type(s):

'QCL-TypeA' for a CSI-RS resource in the higher-layer parameter NZP-CSI-RS-ResourceSet configured with the higher layer parameter trs-Info and, when applicable, 'QCL-TypeD' for the same CSI-RS resource, or
'QCL-TypeA' for a CSI-RS resource in the higher-layer parameter NZP-CSI-RS-ResourceSet configured with the higher-layer parameter trs-Info and, when applicable, 'QCL-TypeD' for an SS/PBCH block, or
'QCL-TypeA' for a CSI-RS resource in the higher-layer parameter NZP-CSI-RS-ResourceSet configured with the higher-layer parameter trs-Info and, when applicable, 'QCL-TypeD' for a CSI-RS resource in the higher-layer parameter NZP-CSI-RS-ResourceSet configured with the higher-layer parameter repetition, or
'QCL-TypeB' for a CSI-RS resource in the higher-layer parameter NZP-CSI-RS-ResourceSet configured with the higher-layer parameter trs-Info when 'QCL-TypeD' is not applicable.

For a CSI-RS resource in the higher-layer parameter NZP-CSI-RS-ResourceSet configured with the higher-layer parameter repetition, the UE should assume that a TCI state indicates one of the following QCL type(s):

'QCL-TypeA' for a CSI-RS resource in the higher-layer parameter NZP-CSI-RS-ResourceSet configured with the higher-layer parameter trs-Info and, when applicable, 'QCL-TypeD' for the same CSI-RS resource, or
'QCL-TypeA' for a CSI-RS resource in the higher-layer parameter NZP-CSI-RS-ResourceSet configured with the higher-layer parameter trs-Info and, when applicable, 'QCL-TypeD' for a CSI-RS resource in the higher-layer parameter NZP-CSI-RS-ResourceSet configured with the higher-layer parameter repetition, or
'QCL-TypeC' for an SS/PBCH block and, when applicable, 'QCL-TypeD' for the same SS/PBCH block.

For the DMRS of a PDCCH, the UE should assume that a TCI state indicates one of the following QCL type(s):

'QCL-TypeA' for a CSI-RS resource in the higher-layer parameter NZP-CSI-RS-ResourceSet configured with the higher-layer parameter trs-Info and, when applicable, 'QCL-TypeD' for the same CSI-RS resource, or
'QCL-TypeA' for a CSI-RS resource in the higher-layer parameter NZP-CSI-RS-ResourceSet configured with the higher-layer parameter trs-Info and, when applicable, 'QCL-TypeD' with a CSI-RS resource in the higher-layer parameter NZP-CSI-RS-ResourceSet configured with the higher-layer parameter repetition, or
'QCL-TypeA' for a CSI-RS resource in the higher-layer parameter NZP-CSI-RS-ResourceSet configured without the higher-layer parameter trs-Info and without the higher-layer parameter repetition, and when applicable, 'QCL-TypeD' for the same CSI-RS resource.

For the DMRS of a PDSCH, the UE should assume that a TCI state should indicate one of the following QCL type(s):

'QCL-TypeA' for a CSI-RS resource in the higher-layer parameter NZP-CSI-RS-ResourceSet configured with the higher-layer parameter trs-Info and, when applicable, 'QCL-TypeD' for the same CSI-RS resource, or
'QCL-TypeA' for a CSI-RS resource in the higher-layer parameter NZP-CSI-RS-ResourceSet configured with the higher-layer parameter trs-Info and, when applicable, 'QCL-TypeD' with a CSI-RS resource in the higher-layer parameter NZP-CSI-RS-ResourceSet configured with the higher-layer parameter repetition, or
'QCL-TypeA' for a CSI-RS resource in the higher-layer parameter NZP-CSI-RS-ResourceSet configured without the higher-layer parameter trs-Info and without the higher-layer parameter repetition, and when applicable, 'QCL-TypeD' for the same CSI-RS resource.

1.8. Bandwidth Part (BWP)

In the NR system to which the present disclosure is applicable, frequency resources of up to 400 MHz per component carrier (CC) may be allocated/supported. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include contiguous RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency area in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for a UE associated with the wideband CC, and activate at least one of DL/UL BWPs configured at a specific time point (by L1 signaling (e.g., DCI or the like), MAC signaling, RRC signaling, or the like). The activated DL/UL BWP may be referred to as an active DL/UL BWP. During initial access or before an RRC connection setup, the UE may not receive a configuration for a DL/UL BWP from the BS. A DL/UL BWP assumed for the UE is defined as an initial active DL/UL BWP.

1.9. Control Resource Set (CORESET)

A CORESET includes $N^{CORSET}_{RB}$ RBs in the frequency domain and $N^{CORSET}_{symb}$ ($N^{CORSET}_{symb} \in \{0, 1, 2\}$) symbols in the time domain.

One control channel element (CCE) includes 6 resource element groups (REGs) where an REG is equivalent to one RB over one OFDM symbol. REGs within a CORESET are numbered in increasing order in a time-first manner. Specifically, the numbering starts with 0 for the first OFDM symbol and the lowest-numbered RB in the CORESET.

A UE may be configured with multiple CORESETs. Each CORESET is associated with one CCE-to-REG mapping only.

The CCE-to-REG mapping for a CORESET may be interleaved or non-interleaved.

Configuration inform for the CORESET may be described by a higher-layer parameter ControlResourceSet IE.

Further, configuration information for CORESET 0 (e.g., a common CORESET) may be configured by a higher-layer parameter ControlResourceSetZero IE.

1.10. DL Measurement

To enable a BS to support handover of a UE or inter-cell interference adjustment, the UE needs to perform a DL measurement and report the DL measurement to the BS. DL measurements include various measurement schemes and measurement values, such as radio link monitoring (RLM) measurement, measurement for CSI reporting, and radio resource management (RRM) measurement.

The RLM measurement may include, for example, a DL measurement used in the process of detecting radio link failure (RLF) and searching for a new radio link. The measurement for CSI reporting may include, for example, measurement of the quality of a DL channel to select/calculate and report an appropriate RI, PMI, and CQI. The RRM measurement may include, for example, measurement required to determine handover of a UE.

The RRM measurement may include measurement of a reference signal received power (RSRP), a reference signal received quality (RSRQ), a received signal strength indicator (RSSI), and a signal-to-noise and interference ratio (SINR).

In the NR system to which the present disclosure is applicable, an RS for RRM measurement may be one or both of a synchronization signal (SS) and a CSI-RS.

An SS-RSRP is defined as the linear average of the power of REs carrying an SSS in a frequency bandwidth. Measurement time resources for the SS-RSRP are confined within an SS/PBCH block measurement time configuration (SMTC) window duration. If the SS-RSRP is used for an L1-RSRP configured by a report configuration, the measurement time resource limitation to the SMTC window duration is not applied.

For SS-RSRP determination, a PBCH DMRS and, if indicated by a higher layer, a CSI RS may be used in addition to an SSS. The SS-RSRP using the PBCH DMRS or CSI-RS is defined as the linear average of the power of REs that carry corresponding RSs, taking into account power scaling for the RSs. If the SS-RSRP is not used for the L1-RSRP, additional use of the CSI-RS for SS-RSRP determination is not applied.

The SS-RSRP may be measured only in RSs corresponding to SS/PBCH blocks having the same SS/PBCH block index and the same physical layer cell ID.

A CSI-RSRP is defined as the linear average over the power of REs that carry a CSI-RS. The CSI-RS configured for RSRP measurements may be configured within a considered measurement frequency bandwidth in configured CSI-RS occasions.

An SS-RSRQ is defined as the ratio of Nx SS-RSRP/(NR carrier RSSI), where N is the number of RBs in an NR carrier RSSI measurement bandwidth. The measurements in the numerator (N×SS-RSRP) and denominator (NR carrier RSSI) may be made over the same set of RBs.

'NR carrier RSSI' includes the linear average of the total received power observed only in certain OFDM symbols of measurement time resources, in the measurement bandwidth, over N RBs from all sources, including co-channel serving and non-serving cells, adjacent channel interference, thermal noise, and so on. The measurement time resources for the NR carrier RSSI are confined within an SMTC window duration. Additionally, when indicated by higher-layer signaling, the NR carrier RSSI is measured in a slot and a symbol indicated by higher-layer signaling.

A CSI-RSRP is defined as the value obtained by dividing the product of a CSI-RSRP and the number of RBs within a CSI-RSSI measurement bandwidth by a 'CSI-RSSI' (i.e., CSI-RSRQ=N×CSI-RSRP/(CSI RSSI)). The numerator (N×CSI-RSRP) and the denominator (CSI RSSI) are measured over the same RB set.

A 'CSI-RSSI' includes the linear average of the total received power observed only in OFDM symbols of measurement time resources, in a measurement bandwidth, over N RBs from all sources, including co-channel serving and non-serving cells, adjacent channel interference, thermal noise, and so on. The measurement time resources for the CSI-RSSI correspond to OFDM symbols containing configured CSI-RS occasions.

An SS-SINR is defined as the linear average of the power of REs carrying an SSS divided by the linear average of the noise and interference power of the REs carrying the SSS within the same frequency bandwidth. Measurement time resources for the SS-SINR are limited within an SMTC window duration. For SS-SINR determination, a PBCH DMRS may be used in addition to the SSS.

A CSI-SINR is defined as the linear average of the power of REs carrying a CSI-RS divided by the linear average of the noise and interference power of the REs carrying the CSI-RS within the same frequency bandwidth.

1.11. RRC States

Figure 17:
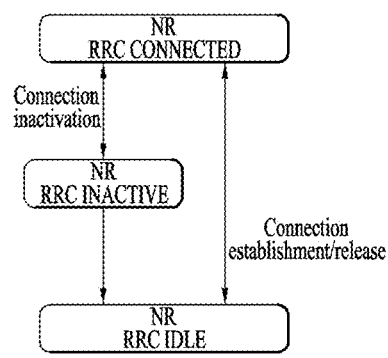
FIG. 17 is a diagram illustrating radio resource control (RRC) states and RRC state transitions of a user equipment (UE)

FIG. 17 is a diagram illustrating RRC states and RRC state transitions of a UE. The UE is placed only in one RRC state at a specific time.

Figure 18:
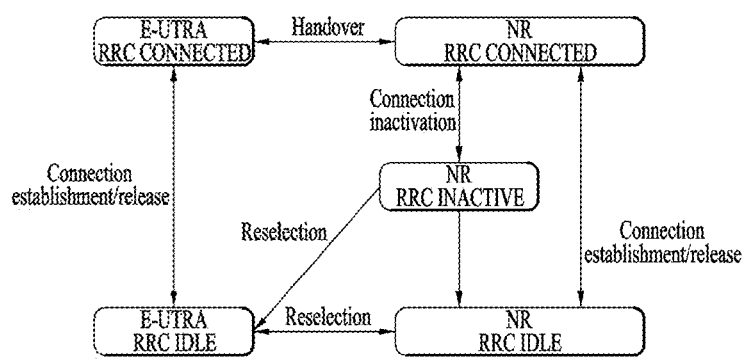
FIG. 18 is a diagram illustrating a mobility procedure supported between an NR/next generation core (NGC) and an evolved-universal terrestrial radio access network (E-UTRAN)/evolved packet core (EPC) as well as RRC states and RRC state transitions of a UE.

FIG. 18 is a diagram illustrating a mobility procedure supported between an NR/next generation core (NGC) and an evolved-universal terrestrial radio access network (E-UTRAN)/evolved packet core (EPC) as well as RRC states and RRC state transitions of a UE.

An RRC state indicates whether the RRC layer of the UE is logically connected to an NG radio access network (RAN). When an RRC connection is established, the UE may be in RRC_CONNECTED or RRC_INACTIVE state. Alternatively, when an RRC connection is not established, the UE is in RRC_IDLE state.

In the RRC_CONNECTED or RRC_INACTIVE state, the UE has an RRC connection. Thus, the NG RAN may recognize the presence of the UE on a cell basis. On the contrary, in the RRC_IDLE state, the UE may not be recognized by the NG RAN and is managed by a core network on a tracking area basis, a tracking area being a unit larger than a cell.

When a user initially turns on the UE, the UE searches for an appropriate cell and is maintained in the RRC_IDLE state in the cell. Only when the UE needs to establish an RRC connection, the RRC-IDLE UE establishes the RRC connection with the NG RAN in an RRC connection procedure and transitions to the RRC_CONNECTED or RRC_INACTIVE state.

The RRC states of the UE have the following characteristics.

(1) RRC_IDLE State

The UE may be configured with discontinuous reception (DRX) by a higher layer.

The mobility of the UE is controlled based on a network configuration.

The UE monitors a paging channel.

The UE performs neighbor cell measurement and cell (re)selection.

The UE acquires system information.

(2) RRC_INACTIVE State

The UE may be configured with DRX by a higher layer or RRC layer.

The mobility of the UE is controlled based on a network configuration.

The UE stores an access stratum (AS) context.

The UE monitors a paging channel.

The UE performs neighbor cell measurement and cell (re)selection.

When the UE moves out of a RAN-based notification area, the UE performs a RAN-based notification area update.

The UE acquires system information.

(3) RRC_CONNECTED State

The UE stores an AS context.

The UE transmits and receives unicast data.

In a lower layer, the UE may be configured with UE-specific DRX.

For an increased bandwidth, the UE supporting carrier aggregation (CA) may use one or more SCells combined with a special cell (SpCell).

For an increased bandwidth, the UE supporting dual connectivity (DC) may use a secondary cell group (SCG) combined with a master cell group (MCG).

The UE monitors a paging channel.

When data is scheduled for the UE, the UE monitors control channels associated with a shared data channel.

The UE provides channel quality and feedback information.

The UE performs neighbor cell measurement and cell (re)selection.

The UE acquires system information.

Particularly, the UE may operate as follows in the RRC_IDLE state and the RRC_INACTIVE state.

TABLE 9

| | UE procedure |
|---|---|
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

1.12. Discontinuous Reception (DRX)

According to an embodiment applicable to the present disclosure, a UE may perform a DRX operation. A UE configured with DRX may reduce power consumption by receiving a DL signal discontinuously. DRX may be performed in the RRC_IDLE state, the RRC_INACTIVE state, and the RRC_CONNECTED state. In the RRC_IDLE state and the RRC_INACTIVE state, DRX is used for discontinuous reception of a paging signal. Hereinbelow, DRX in the RRC_CONNECTED state (RRC_CONNECTED DRX) will be described.

FIG. 9 is a diagram illustrating a DRX cycle of a UE, which is applicable to the present disclosure. The DRX cycle illustrated in FIG. 19 corresponds to a DRX cycle of a UE in the RRC_CONNECTED state.

Figure 19:
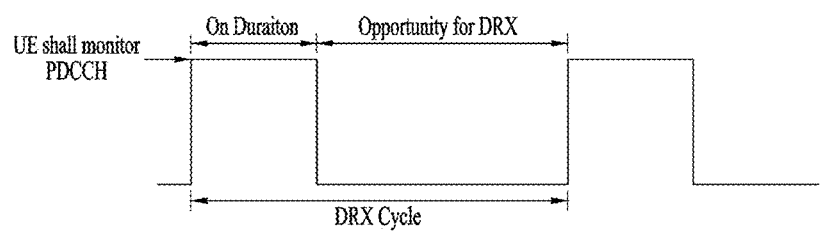
FIG. 19 is a diagram illustrating a discontinuous reception (DRX) cycle of a UE, which is applicable to the present disclosure.

Referring to FIG. 19, the DRX cycle includes On Duration and Opportunity for DRX. The DRX cycle defines a time interval in which On Duration is periodically repeated. On Duration is a time period during which the UE monitors to receive a PDCCH. During On Duration, the UE performs PDCCH monitoring. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (slots having PDCCH search spaces) may be configured continuously in the present disclosure.

Table 10 describes a UE operation related to DRX (in the RRC_CONNECTED state). Referring to Table 10, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 19.

TABLE 10

|  | Type of signals | UE procedure |
| --- | --- | --- |
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

Herein, when at least one of drx-OnDurationTimer, drx-InactivityTimer, drx-HARQ-RTT-TimerDL, and drx-HARQ-RTT-TimerDL is running, the UE performs PDCCH monitoring in each PDCCH occasion, while staying in the awake state.

2. Unlicensed Band System

Figure 20A:
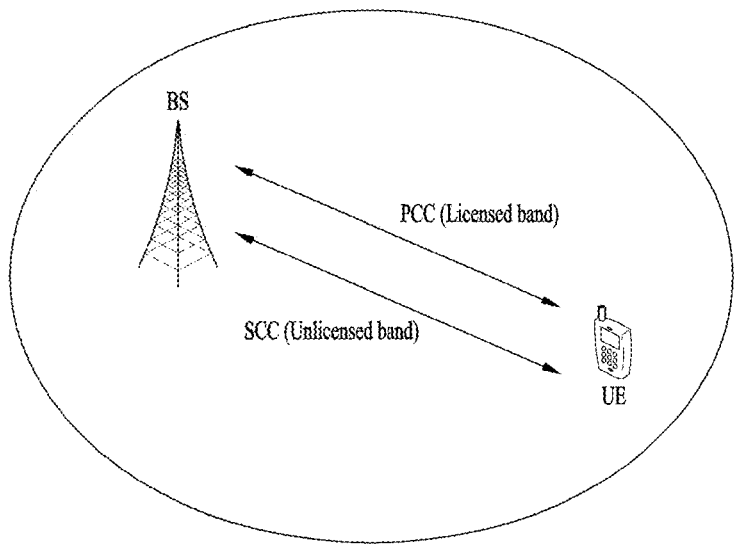
FIGS. 20A and 20B illustrate an exemplary wireless communication system supporting an unlicensed band, which is applicable to the present disclosure.
Figure 20B:
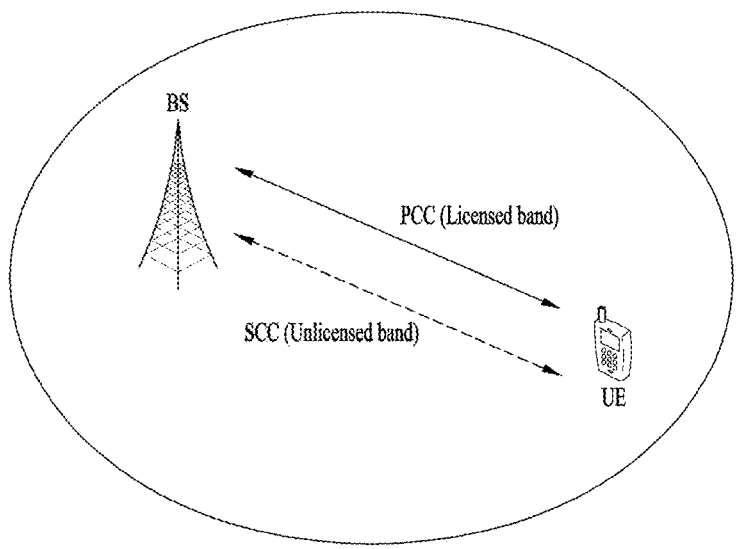

FIGS. 20A and 20B illustrate an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 20A, when the UE and the BS transmit and receive signals in carrier-aggregated LCC and UCC, the LCC may be configured as a primary CC (PCC) and the UCC may be configured as a secondary CC (SCC).

As illustrated in FIG. 20B, the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in an unlicensed band according to the present disclosure may be performed based on all the deployment scenarios described above (unless otherwise stated).

2.1. Radio Frame Structure for Unlicensed Band

Frame structure type 3 of LTE (see FIG. 3) or the NR frame structure (see FIG. 7) may be used for operation in the unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

Specifically, in the LTE system supporting the unlicensed band, the UE may assume (or identify) the configuration of OFDM symbols occupied in subframe #n by a specific field (e.g., a Subframe configuration for LAA field) in DCI received in subframe #n−1 or subframe #n from the BS.

Table 11 illustrates an exemplary method of indicating the configuration of OFDM symbols used for transmission of a DL physical channel and/or physical signal in a current and/or next subframe by the Subframe configuration for LAA field.

TABLE 11

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission duration to the UE by signaling.

Specifically, in the LTE system supporting the unlicensed band, the UE may acquire 'UL duration' and 'UL offset' information for subframe #n from a 'UL duration and offset' field in detected DCI.

Table 12 illustrates an exemplary method of indicating a UL offset and UL duration configuration by the UL duration and offset field in the LTE system.

TABLE 12

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) UL offset l and UL duration d for subframe #n, the UE may not need to receive a DL physical channel and/or physical signal in subframe #n+l+i (i=0, 1, . . . , d−1).

2.2. DL Channel Access Procedure (DL CAP)

For a DL signal transmission in the unlicensed band, the BS may perform a DL CAP for the unlicensed band. On the assumption that the BS is configured with a PCell that is a licensed band and one or more SCells which are unlicensed bands, a DL CAP operation applicable to the present disclosure will be described below in detail, with the unlicensed bands represented as licensed assisted access (LAA) SCells. The DL CAP operation may be applied in the same manner even when only an unlicensed band is configured for the BS.

2.2.1. Channel Access Procedure for Transmission(s) Including PDSCH/PDCCH/EPDCCH The BS senses whether a channel is in an idle state for a slot duration of a defer duration $T_d$. After a counter N is decremented to 0 in step 4 as described later, the BS may perform a transmission including a PDSCH/PDCCH/EPDCCH on a carrier on which the next LAA SCell(s) transmission is performed. The counter N may be adjusted by sensing the channel for an additional slot duration according to the following procedure.

1) Set N=$N_{init}$ where $N_{init}$ is a random number uniformly distributed between 0 and $CW_p$, and go to step 4.

2) If N>0 and the BS chooses to reduce the counter, set N=N−1.

3) Sense the channel for an additional slot duration, and if the additional slot duration is idle, go to step 4. Else, go to step 5.

4) If N=, stop. Else, go to step 2.

5) Sense the channel until a busy slot is detected within the additional defer duration $T_d$ or all slots of the additional defer duration $T_d$ are sensed as idle.

6) If the channel is sensed as idle for all slot durations of the additional defer duration $T_d$, go to step 4. Else, go to step 5.

The above-described CAP for a transmission including a PDSCH/PDCCH/EPDCCH of the BS may be summarized as follows.

Figure 21:
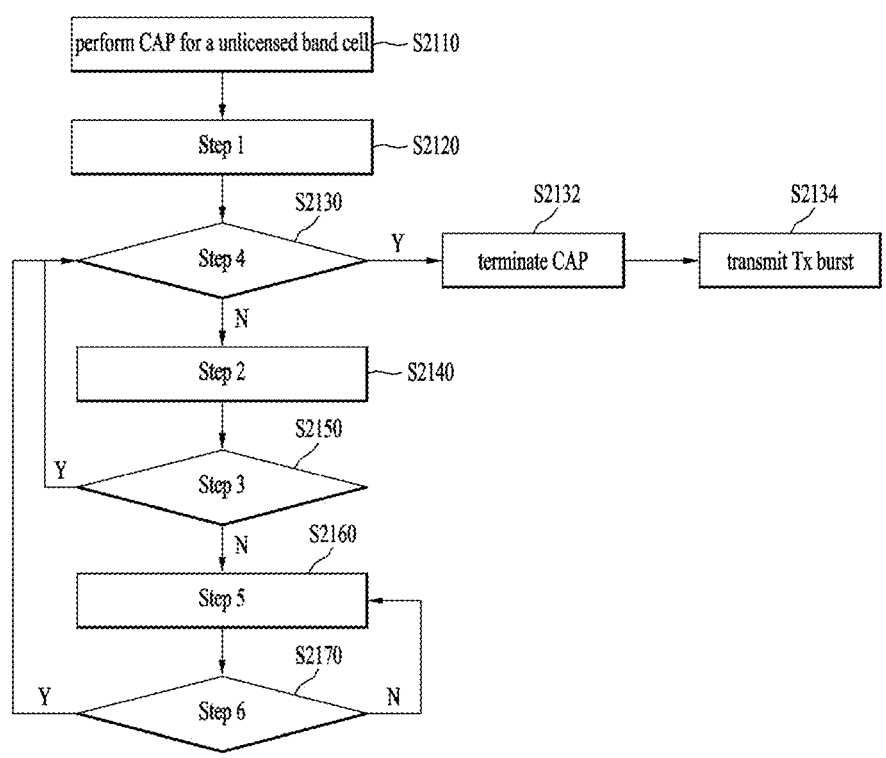
FIG. 21 is a diagram illustrating a channel access procedure (CAP) for transmission in an unlicensed band, which is applicable to the present disclosure.

FIG. 21 is a flowchart illustrating a CAP for transmission in an unlicensed band, which is applicable to the present disclosure.

For a DL transmission, a transmission node (e.g., a BS) may initiate the CAP to operate in LAA SCell(s) which is unlicensed band cell(s) (S2110).

The BS may randomly select a backoff counter N within a contention window (CW) according to step 1. N is set to an initial value, $N_{init}$ (S2120). $N_{init}$ is a random value selected from among the values between 0 and $CW_p$.

Subsequently, if the backoff counter N is 0 in step 4 (Y in S2130), the BS terminates the CAP (S2132). Subsequently, the BS may perform a Tx burst transmission including a PDSCH/PDCCH/EPDCCH (S2134). On the other hand, if the backoff counter N is not 0 (N in S2130), the BS decrements the backoff counter N by 1 according to step 2 (S2140).

Subsequently, the BS determines whether the channel of the LAA SCell(s) is in an idle state (S2150). If the channel is in the idle state (Y in S2150), the BS determines whether the backoff counter N is 0 (S2130).

On the contrary, if the channel is not idle in step S2150, that is, the channel is busy (N in S2150), the BS determines whether the channel is in the idle state for a defer duration $T_d$ (25 usec or more) longer than a slot time (e.g., 9 usec) according to step 5 (S2160). If the channel is idle for the defer duration (Y in S2170), the BS may resume the CAP.

For example, if the backoff counter $N_{init}$ is 10 and then reduced to 5, and the channel is determined to be busy, the BS senses the channel for the defer duration and determines whether the channel is idle. If the channel is idle for the defer duration, the BS may resume the CAP from a backoff counter value 5 (or from a backoff counter value 4 after decrementing the backoff counter value by 1).

On the other hand, if the channel is busy for the defer duration (N in S2170), the BS re-performs step S2160 to check again whether the channel is idle for a new defer duration.

In the above procedure, if the BS does not perform the transmission including the PDSCH/PDCCH/EPDCCH on the carrier on which a LAA SCell(s) transmission is performed after step 4, the BS may perform the transmission including the PDSCH/PDCCH/EPDCCH on the carrier, when the following conditions are satisfied:

When the BS is prepared to transmit the PDSCH/PDCCH/EPDCCH and the channel is sensed as idle for at least a slot duration $T_{sl}$, or for all slot durations of the defer duration $T_d$ immediately before the transmission; and On the contrary, when the BS does not sense the channel as idle for the slot duration $T_{sl}$ or for any of the slot durations of the defer duration $T_d$ immediately before the intended transmission, the BS proceeds to step 1 after sensing the channel as idle for a slot duration of the defer duration $T_d$.

The defer duration $T_d$ includes a duration of $T_f$ (=16 us) immediately followed by $m_p$ consecutive slot durations where each slot duration $T_{sl}$ is 9 us, and $T_f$ includes an idle slot duration $T_{sl}$ at the start of $T_f$.

If the BS senses the channel for the slot duration $T_{sl}$ and power detected by the BS for at least 4 us within the slot duration is less than an energy detection threshold $X_{Thresh}$, the slot duration $T_{sl}$ is considered to be idle. Otherwise, the slot duration $T_1$ is considered to be busy.

$CW_{min,p} \leq CW_p \leq CW_{max,p}$ represents a contention window. $CW_p$ adjustment will be described in section 2.2.3.

$CW_{min,p}$ and $CW_{max,p}$ are chosen before step 1 of the above procedure.

$m_p$, $CW_{min,p}$, and $CW_{max,p}$ are based on a channel access priority class associated with the transmission of the BS (see Table 13 below).

$X_{Thresh}$ is adjusted according to section 2.2.4.

TABLE 13

| Channel Access Priority Class (p) | $m_p$ | $CW_{min,p}$ | $CW_{max,p}$ | $T_{m\_cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the BS performs a discovery signal transmission which does not include a PDSCH/PDCCH/EPDCCH when N>0 in the above procedure, the BS does not decrement N for a slot duration overlapping with the discovery signal transmission.

The BS does not continuously perform transmissions on the channel, for a period exceeding $T_{mcot,p}$ as given in Table 13 on the carrier on which an LASS SCell transmission is performed.

For p=3 and p=4 in Table 13, if the absence of any other technology sharing the carrier may be guaranteed on a long term basis (e.g., by level of regulation), $T_{mcot,p}$=10 ms and otherwise, $T_{mcot,p}$=8 ms.

2.2.2. Channel Access Procedure for Transmissions Including Discovery Signal Transmission(S) and not Including PDSCH If the transmission duration of the BS is 1 ms or less, the BS may perform a transmission including a discovery signal transmission without a PDSCH on a carrier on which a LAA SCell transmission is performed, immediately after a corresponding channel is sensed as idle for at least a sensing interval $T_{drs}$ (=25 us). $T_{drs}$ includes a duration of $T_f$(=16 us) immediately followed by one slot duration $T_{sl}$ (=9 us). $T_f$ includes an idle slot duration $T_{sl}$ at the start of $T_f$. If the channel is sensed as idle for the slot duration $T_{drs}$, the channel is considered to be idle for $T_{drs}$.

2.2.3. Contention Window Adjustment Procedure

If the BS performs a transmission including a PDSCH associated with a channel access priority class p on a carrier, the BS maintains and adjusts a contention window value $CW_p$ by using the following procedures before step 1 of the procedure described in section 2.2.1. for the transmission (i.e., before performing a CAP):

1> Set $CW_p=CW_{min,p}$ for all priority classes p∈{1,2,3,4}.

2> If at least 80% (z=80%) of HARQ-ACK values corresponding to PDSCH transmission(s) in a reference subframe k are determined to be NACK, the BS increments $CW_p$ for all priority classes p∈{1,2,3,4} to the next higher allowed value and remains in step 2. Otherwise, the BS goes to step 1.

In other words, when the probability that the HARQ-ACK values corresponding to the PDSCH transmission(s) in reference subframe k are determined to be NACK is at least 80%, the BS increments a CW value set for each priority class to the next higher value. Alternatively, the BS maintains the CW value set for each priority class to be an initial value.

Reference subframe k is the starting subframe of the most recent transmission on the carrier made by the BS, for which at least some HARQ-ACK feedback is expected to be available.

The BS adjusts the $CW_p$ values for all priority classes p∈{1,2,3,4} only once based on the given reference subframe k.

If $CW_p=CW_{max,p}$, the next higher allowed value for the $CW_p$ adjustment is $CW_{max,p}$.

The probability Z of determining HARQ-ACK values corresponding to PDSCH transmission(s) in reference subframe k to be NACK may be determined in consideration of the following.

If the transmission(s) of the BS for which HARQ-ACK feedback is available starts in the second slot of subframe k, HARQ-ACK values corresponding to PDSCH transmission(s) in subframe k and additionally, HARQ-ACK values corresponding to PDSCH transmission(s) in subframe k+1 are used.

If HARQ-ACK values correspond to PDSCH transmission(s) in the same LAA SCell allocated by an (E)PDCCH transmitted in LAA SCell, If an HARQ-ACK feedback for a PDSCH transmission of the BS is not detected or if the BS detects a 'DTX', 'NACK/DTX' or (any) other state, it is counted as NACK.

If the HARQ-ACK values correspond to PDSCH transmission(s) in another LAA SCell allocated by an (E)PDCCH transmitted in the LAA SCell, If an HARQ-ACK feedback for a PDSCH transmission of the BS is detected, 'NACK/DTX' or (any) other state is counted as NACK and the 'DTX' state is ignored.

If an HARQ-ACK feedback for a PDSCH transmission of the BS is not detected,

If it is expected that the BS will use PUCCH format 1 with channel selection, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

If the PDSCH transmission has two codewords, an HARQ-ACK value for each codeword is considered individually.

A bundled HARQ-ACK across M subframes is considered to be M HARQ-ACK responses.

If the BS performs a transmission which includes a PDCCH/EPDDCH with DCI format 0A/0B/4A/4B and does not include a PDSCH associated with the channel access priority class p on a channel starting from time $t_0$, the BS maintains and adjusts the competing window size $CW_p$ by using the following procedures before step 1 of the procedure described in section 2.2.1. for the transmission (i.e., before performing the CAP):

1> Set $CW_p=CW_{min,p}$ for all priority classes p∈{1,2,3,4}.

2> If a UE using a type 2 CAP (described in section 2.3.1.2.) successfully receives less than 10% of UL transport blocks (TBs) scheduled by the BS during a time period $t_0$ and $t_0+T_{CO}$, the BS increments $CW_p$ for all priority classes to the next higher allowed value and remains in step 2. Otherwise, the BS goes to step 1.

$T_{CO}$ is calculated according to section 2.3.1.

If $CW_p=CW_{max,p}$ is used K times consecutively to generate $N_{init}$, only $CW_p$ for a priority class p for $CW_p=CW_{max,p}$ used K times consecutively to generate $N_{init}$ is reset to $CW_{min,p}$. the BS then selects K from a set of (1, 2, ..., 8) values for each priority class $p \in \{1,2,3,4\}$.

2.2.4. Energy Detection Threshold Adaptation Procedure

A BS accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the absence of any other technology sharing the carrier may be guaranteed on a long term basis (e.g., by level of regulation), $$X_{Thresh\_max} = \min \left\{ \begin{array}{c} T_{max} + 10 \text{ dB}, \\ X_r \end{array} \right\}$$

where $X_r$ is the maximum energy detection threshold (in dBm) defined in regulatory requirements, when the regulation is defined. Otherwise, $X_r = T_{max} + 10$ dB.

Else, $$X_{Thres\_max} = \max \left\{ \min \left\{ \begin{array}{c} -72 + 10 \cdot \log 10(BWMHz/20 \text{ MHz}) \text{ dBm}, \\ T_{max}, \\ T_{max} - T_A + (P_H + 10 \cdot \log 10(BWMHz/20 \text{ MHz}) - P_{TX}) \end{array} \right\} \right\}$$

Herein, each variable is defined as follows.

$T_A = 10$ dB for transmission(s) including PDSCH;

$T_A = 5$ dB for transmissions including discovery signal transmission(s) and not including PDSCH;

$P_H = 123$ dBm;

$P_{TX}$ is the set maximum eNB output power in dBm for the carrier;

eNB uses the set maximum transmission power over a single carrier irrespective of whether single carrier or multi-carrier transmission is employed $T_{max}(\text{dBm}) = 10 \cdot \log \, 10(3.16228 \cdot 10^{-8} \text{ (mW/MHz)} \cdot BWMHz(MHz))$;

BWMHz is the single carrier bandwidth in MHz.

2.2.5. Channel Access Procedure for Transmission(s) on Multiple Carriers

The BS may access multiple carriers on which a LAA SCell transmission is performed in one of the following type A or type B procedures.

2.2.5.1. Type A Multi-Carrier Access Procedures

According to the procedure described in this section, the BS performs channel access on each carrier $c_i \in C$ where C is a set of intended carriers to be transmitted by the BS, $i = 0, 1, \ldots q-1$, and q is the number of carriers to be transmitted by the BS.

The counter N described in section 2.2.1 (i.e., the counter N considered in the CAP) is determined for each carrier $c_i$, and in this case, the counter for each carrier is represented as $N_{c_i} \cdot N_{c_i}$ is maintained according to section 2.2.5.1.1. or section 2.2.5.1.2.

2.2.5.1.1. Type A1

The counter N described in section 2.2.1 (i.e., the counter N considered in the CAP) is determined for each carrier $c_i$, and the counter for each carrier is represented as $N_{c_i}$.

In the case where the BS ceases a transmission on one carrier $c_j \in C$, if the absence of any other technology sharing the carrier may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each carrier $c_i$ (where $c_i$ is different from $c_j$, $c_i \neq c_j$).

2.2.5.1.2. Type A2

The counter N for each carrier $c_i \in C$ may be determined according to section 2.2.1., and is denoted by $N_{c_j}$. Here, $c_j$ may mean a carrier having the largest $CW_p$ value. For each carrier $c_j$, $N_{c_i} = N_{c_j}$.

When the BS ceases a transmission on any one carrier for which $N_{c_i}$ has been determined by the BS, the BS reinitializes $N_{c_i}$ for all carriers.

2.2.5.2. Type B Multi-Carrier Access Procedure

A carrier $c_j \in C$ may be selected by the BS as follows.

The BS selects $c_j$ uniformly randomly from C before each transmission on multiple carriers $c_i \in C$, or The BS does not select $c_j$ more than once every one second.

Herein, C is a set of carriers to be transmitted by the BS, $i = 0, 1, \ldots q-1$, and q is the number of carriers to be transmitted by the BS.

For a transmission on a carrier $c_j$, the BS performs channel access on the carrier $c_j$ according to the procedure described in section 2.2.1 along with the modification described in section 2.2.5.2.1 or section 2.2.5.2.2.

For a transmission on the carrier $c_i \neq c_j$ among the carriers $c_i \in C$, For each carrier $c_i$, the BS senses the carrier $c_i$ for at least a sensing interval $T_{inc} = 25$ us immediately before the transmission on the carrier $c_i$. The BS may perform a transmission on the carrier $c_i$ immediately after sensing that the carrier $c_i$ is idle for at least the sensing interval $T_{inc}$. When the channel is sensed as idle during all time periods in which idle sensing is performed on the carrier $c_i$ within the given period $T_{inc}$, the carrier $c_i$ may be considered to be idle for $T_{inc}$.

The BS does not continuously perform transmissions on the carrier $c_i \neq c_j$ ($c_j \in C$) for a period exceeding $T_{mcot,p}$ as given in Table 6. $T_{mcot,p}$ is determined using the channel access parameter used for the carrier $c_j$.

2.2.5.2.1. Type B1

A single $CW_p$ value is maintained for the carrier set C.

To determine $CW_p$ for channel access on a carrier $c_j$, step 2 in the procedure described in section 2.2.3. is modified as follows.

If at least 80% (Z=80%) of HARQ-ACK values corresponding to PDSCH transmission(s) in reference subframe k of all carriers $c_i \in C$ are determined to be NACK, then $CW_p$ for all priority classes $p \in \{1,2,3,4\}$ is incremented to the next higher allowed value. Otherwise, the procedure goes to step 1.

2.2.5.2.2. Type B2 (Type B2)

The $CW_p$ value is maintained independently for each carrier $c_i \in C$ by using the procedure described in section 2.2.3. To determine $N_{init}$ for the carrier $c_j$, the $CW_p$ value of the carrier $c_{j1} \in C$ is used. Here, $c_{j1}$ is a carrier having the largest $CW_p$ among all carriers in the set C.

2.3. Uplink Channel Access Procedures

The UE and the BS that schedules a UL transmission for the UE perform the following procedure for access to a channel in which LAA SCell transmission(s) is performed. On the assumption that the UE and the BS are basically configured with a PCell that is a licensed band and one or more SCells which are unlicensed bands, a UL CAP operation applicable to the present disclosure will be described below in detail, with the unlicensed bands represented as LAA SCells. The UL CAP operation may be applied in the same manner even when only an unlicensed band is configured for the UE and the BS.

2.3.1. Channel Access Procedure for Uplink Transmission(s)

The UE may access a carrier on which LAA SCell UL transmission(s) are performed according to a type 1 or type 2 UL CAP. The type 1 CAP is described in section 2.3.1.1, and the type 2 CAP is described in section 2.3.1.2.

If a UL grant that schedules a PUSCH transmission indicates the type 1 CAP, the UE performs type 1 channel access to perform a transmission including the PUSCH transmission, unless otherwise stated in this section.

If the UL grant that schedules the PUSCH transmission indicates the type 2 CAP, the UE performs type 2 channel access to perform a transmission including the PUSCH transmission, unless otherwise stated in this section.

The UE performs type 1 channel access for an SRS transmission that does not include a PUSCH transmission. A UL channel access priority class p=1 is used for the SRS transmission that does not include a PUSCH.

TABLE 14

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1073 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

When the 'UL configuration for LAA' field configures 'UL offset' l and 'UL duration' d for subframe n, If the end of a UE transmission occurs in or before subframe n+l+d−1, the UE may use the type 2 CAP for transmission in subframe n+l+i (where i=0, 1, . . . d−1).

If the UE is scheduled to perform a transmission including a PUSCH in a subframe set $n_0$, $n_1$, . . . , $n_{w-1}$ by using PDCCH DCI format 0B/4B, and the UE may not perform channel access for transmission in subframe $n_k$, the UE should attempt to make a transmission in subframe $n_{k+1}$ according to a channel access type indicated by DCI. k∈{0, 1, . . . w−2} and w is the number of scheduled subframes indicated by the DCI.

If the UE is scheduled to perform a transmission including a PUSCH without gaps in the subframe set $n_0$, $n_1$, . . . , $n_{w-1}$ by using one or more of PDCCH Do formats 0A/0B/4A/4B, and performs a transmission in subframe $n_k$ after accessing a carrier according to the type 1 or type 2 CAP, the UE may continue the transmission in a subframe after $n_k$ where k∈{0, 1, . . . w−1}.

If the start of the UE transmission in subframe n+1 immediately follows the end of the UE transmission in subframe n, the UE does not expect that a different channel access type will be indicated for the transmission in the subframe.

If the UE is scheduled to perform a transmission without gaps by using one or more of PDCCH DCI formats 0A/0B/4A/4B, stops the transmission during or before subframe $n_{k1}$ (where k1∈{0, 1, . . . w−2}), and continuously senses the corresponding channel as idle after stopping the transmission, the UE may perform the transmission in the type 2 CAP after subframe $n_{k2}$ (where k2∈{1, . . . w−1}). If the channel is not sensed continuously as idle by the UE after the UE stops the transmission, the UE may perform the transmission in the type 1 CAP of a UL channel access priority class indicated by DCI corresponding to subframe $n_{k2}$ after subframe $n_{k2}$ (where k2∈{1, . . . w−1}).

If the UE receives a UL grant, DCI indicates the UE to start a PUSCH transmission in subframe n by using the type 1 CAP, and the UE has an ongoing type 1 CAP before subframe n, If a UL channel access priority class value p1 used for the ongoing type 1 CAP is equal to or greater than a UL channel access priority class value p2 indicated by the DCI, the UE may perform the PUSCH transmission by accessing a carrier in the ongoing type 1 CAP.

If the UL channel access priority class value p1 used for the ongoing type 1 CAP is less than the UL channel access priority class value p2 indicated by the DCI, the UE terminates the ongoing type 1 CAP.

If the UE is scheduled to transmit on a carrier set C in subframe n, a UL grant scheduling a PUSCH transmission on the carrier set C indicates the type 1 CAP, the same 'PUSCH starting position' is indicated for all carriers of the carrier set C, and the carrier frequencies of the carrier set C are a subset of a preset carrier frequency set, The UE may perform a transmission on a carrier $c_i$∈C in the type 2 CAP.

If the type 2 CAP has been performed on the carrier $c_i$ immediately before the UE transmission on a carrier $c_j$∈C, and If the UE has accessed the carrier $c_j$ by using the type 1 CAP, Before performing the type 1 CAP on any one carrier in the carrier set C, the UE uniformly randomly selects the carrier $c_j$ from the carrier set C.

When the BS has transmitted on the carrier according to the CAP described in section 2.2.1, the BS may indicate the type 2 CAP by DCI in a UL grant that schedules a transmission including a PUSCH on the carrier in subframe n.

Alternatively, when the BS has transmitted on the carrier according to the CAP described in section 2.2.1, the BS may indicate that the type 2 CAP is available for the transmission including the PUSCH on the carrier in subframe n by the 'UL Configuration for LAA' field.

Alternatively, when subframe n occurs within a time period starting from $t_0$ and ending at $t_0+T_{CO}$, the BS may schedule the transmission including the PUSCH on the carrier within subframe n following a transmission of a duration $T_{short\_ul}$=25 us from the BS. $T_{CO}=T_{mcot,p}+T_g$ and each variable may be defined as follows.

t0: a time instant at which the BS starts a transmission.

$T_{mcot,p}$: determined by the BS according to section 2.2.

$T_g$: the total period of all gap periods exceeding 25 us occurring between a DL transmission of the BS starting from to and a UL transmission scheduled by the BS and between two UL transmissions scheduled by the BS.

If the UL transmissions are scheduled in succession, the BS schedules the UL transmissions between consecutive subframes in to and $t_0+T_{CO}$.

For the UL transmission on the carrier following the transmission of the BS on the carrier within the duration $T_{short\_ul}$=25 us, the UE may perform the type 2 CAP for the UL transmission.

If the BS indicates the type 2 CAP for the UE by DCI, the BS indicates a channel access priority class used to obtain access to the channel in the DCI.

2.3.1.1. Type 1 UL Channel Access Procedure

After sensing that the channel is idle for a slot duration of a defer duration $T_d$ and the counter N becomes 0 in step 4, the UE may perform a transmission using the type 1 CAP. The counter N is adjusted by sensing the channel for additional slot duration(s) according to the following procedure.

1) Set $N=N_{init}$ where $N_{init}$ is a random number uniformly distributed between 0 and $CW_p$, and go to step 4.
2) If $N>0$ and the BS chooses to decrement the counter, set $N=N-1$.
3) Sense the channel for an additional slot duration, and if the additional slot duration is idle, go to step 4. Else, go to step 5.
4) If $N=$, stop. Else, go to step 2.
5) Sense the channel during all slot durations of an additional defer duration $T_d$.
6) If the channel is sensed as idle during the slot durations of the additional defer duration $T_d$, go to step 4. Else, go to step 5.

The above-described type 1 UL CAP of the UE may be summarized as follows.

For a UL transmission, a transmission node (e.g., a UE) may initiate the CAP to operate in LAA SCell(s) which is an unlicensed band cell (S2110).

The UE may randomly select a backoff counter N within a CW according to step 1. N is set to an initial value $N_{init}$ (S2120). $N_{init}$ is a value selected randomly from among the values between 0 and $CW_p$.

Subsequently, if the backoff counter value N is 0 according to step 4 (Y in S2130), the UE ends the CAP (S2132). Subsequently, the UE may perform a Tx burst transmission (S2134). On the other hand, if the backoff counter value is not 0 (N in S2130), the UE decrements the backoff counter value by 1 according to step 2 (S2140).

Subsequently, the UE checks whether the channel of the LAA SCell(s) is idle (S2150). If the channel is idle (Y in S2150), the UE checks whether the backoff counter value is 0 (S2130).

On the contrary, if the channel is not idle in step S2150, that is, the channel is busy (N in S2150), the UE checks whether the channel is idle for a defer duration $T_d$ (25 usec or more) longer than a slot time (e.g., 9 usec) according to step 5 (S2160). If the channel is idle for the defer duration (Y in S2170), the UE may resume the CAP.

For example, if the backoff counter value $N_{init}$ is 10 and the channel is determined to be busy after the backoff counter value is decremented to 5, the UE determines whether the channel is idle by sensing the channel for the defer duration. In this case, if the channel is idle for the defer duration, the UE may perform the CAP again from the backoff counter value 5 (or from the backoff counter value 4 after decrementing the backoff counter value by 1), instead of setting the backoff counter value $N_{init}$.

On the other hand, if the channel is busy for the defer duration (N in S2170), the UE re-performs S2160 to check again whether the channel is idle for a new defer duration.

In the above procedure, if the UE does not perform the transmission including the PUSCH on the carrier in which LAA SCell transmission(s) is performed after step 4 of the afore-described procedure, the UE may perform the transmission including the PUSCH on the carrier, when the following conditions are satisfied:

When the UE is prepared to transmit the transmission including the PUSCH and the channel is sensed as idle during at least the slot duration $T_{sl}$; and When the channel is sensed as idle during all slot durations of the defer duration $T_d$ immediately before the transmission including the PUSCH.

On the contrary, when the UE senses the channel for the first time after being prepared for the transmission, if the channel is not sensed as idle during the slot duration $T_{sl}$, or during any of all slot durations of the defer duration $T_d$ immediately before the intended transmission including the PUSCH, the UE proceeds to step 1 after sensing the channel as idle during the slot durations of the defer duration $T_d$.

The defer duration $T_d$ includes a duration of $T_f (=16\ us)$ immediately followed by $m_p$ consecutive slot durations where each slot duration $T_{sl}$ is 9 us, and $T_f$ includes an idle slot duration $T_{sl}$ at the start of $T_f$.

If the UE senses the channel during the slot duration $T_{sl}$ and power measured by the UE for at least 4 us in the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window, and $CW_p$ adjustment is described in detail in section 2.3.2. $CW_{min,p}$ and $CW_{max,p}$ are chosen before step 1 of the above procedure.

$m_p$, $CW_{min,p}$, and $CW_{max,p}$ are determined based on a channel access priority class signaled to the UE (see Table 14 below).

$X_{Thresh}$ is adjusted according to section 2.3.3.

2.3.1.2. Type 2 UL Channel Access Procedure

If the UE uses the type 2 CAP for a transmission including a PUSCH, the UE may perform the transmission including the PUSCH immediately after sensing a channel as idle for at least a sensing duration $T_{short\_ul}=25$ us. $T_{short\_ul}$ includes a duration of $T_f(=16\ us)$ immediately followed by one slot duration $T_{sl}(=9\ us)$. $T_f$ includes an idle slot duration $T_{sl}$ at the start of $T_f$. If the channel is sensed as idle during the slot duration $T_{short\_ul}$, the channel is considered to be idle for $T_{short\_ul}$.

2.3.2. Contention Window Adjustment Procedure

If the UE performs a transmission using the type 1 CAP associated with a channel access priority class p on a carrier, the UE maintains and adjusts a contention window value $CW_p$ using the following procedures before step 1 of the procedure described in section 2.3.1.1. for the transmission (i.e., before performing the CAP):

When a new data indicator (NDI) for at least one HARQ process related to HARQ_ID_ref is toggled,
Set $CW_p=CW_{min,p}$ for all priority classes $p \in \{1,2,3,4\}$.
Else, increment $CW_p$ to the next higher allowed value for all priority classes $p \in \{1,2,3,4\}$.

HARQ_ID_ref is the HARQ process ID of a UL-SCH in reference subframe $n_{ref}$. Reference subframe $n_{ref}$ is determined as follows.

When the UE receives a UL grant in subframe $n_g$. Here, subframe $n_w$ is the most recent subframe before subframe $n_g$−3 in which the UE transmits the UL-SCH using the type 1 CAP.

If the UE performs a transmission including a UL-SCH without gaps, starting from subframe $n_0$ in a subframe $n_0, n_1, \ldots, n_w$, reference subframe $n_{ref}$ is subframe $n_0$.
Else, reference subframe $n_{ref}$ is subframe $n_w$.

If the UE is scheduled to perform a transmission including a PUSCH without gaps in a subframe set $n_0, n_1, \ldots, n_{w-1}$, and may not perform any transmission including the PUSCH in the subframe set, the UE may maintain $CW_p$ for all priority classes $p \in \{1,2,3,4\}$ without changing $CW_p$.

If a reference subframe for the recent scheduled transmission is also subframe $n_{ref}$, the UE may maintain $CW_p$ for all priority classes $p \in \{1,2,3,4\}$ equal to $CW_p$ for a transmission including a PUSCH, which uses the recent scheduled type 1 CAP.

If $CW_p = CW_{max,p}$, the next higher allowed value for the $CW_p$ adjustment is $CW_{max,p}$.

If $CW_p = _{max,p}$ is used K times consecutively to generate $N_{init}$, only $CW_p$ for a priority class p for $CW_p = CW_{max,p}$ used K times consecutively to generate $N_{init}$ is reset to $CW_{min,p}$. K is then selected by the UE from a set of $\{1, 2, \ldots, 8\}$ values for each priority class $p \in \{1,2,3,4\}$.

2.3.3. Energy Detection Threshold Adaptation Procedure)

A UE accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the UE is configured with a higher-layer parameter 'maxEnergyDetectionThreshold-r14', $X_{Thresh\_max}$ is set equal to a value signaled by the higher-layer parameter.

Else,

The UE determines $X'_{Thresh\_max}$ according to the procedure described in section 2.3.3.1.

If the UE is configured with a higher-layer parameter maxEnergyDetectionThresholdOffset-r14', $X_{Thresh\_max}$ is set to $X'_{Thresh\_max}$ adjusted according to an offset value signaled by the higher-layer parameter.

Else,

The UE sets $X_{Thresh\_max} = X'_{Thresh\_max}$.

2.3.3.1. Default Maximum Energy Detection Threshold Computation Procedure

If a higher-layer parameter 'absenceOfAnyOtherTechnology-r14' indicates TRUE:

$$X'_{Thresh\_max} = \min\left\{ \begin{array}{c} T_{max} + 10 \text{ dB}, \\ X_r \end{array} \right\}$$

where $X_r$ is a maximum energy detection threshold (in dBm) defined in regulatory requirements when the regulation is defined. Else, $X_r = T_{max} + 10$ dB. $X_r = T_{max} + 10$ dB Else:

$$X'_{Thres\_max} = \max\left\{ \begin{array}{c} -72 + 10 \cdot \log10(BWMHz/20 \text{ MHz}) \text{ dBm}, \\ \min\left\{ \begin{array}{c} T_{max}, \\ T_{max} - T_A + (P_H + 10 \cdot \log10(BWMHz/20 \text{ MHz}) - P_{TX}) \end{array} \right\} \end{array} \right\}$$

Here, each variable is defined as follows.

$T_A = 10$ dB $P_H = 23$ dBm;

$P_{TX}$ is the set to the value of $P_{CMAX\_H,c}$ as defined in 3GPP TS 36.101.

$T_{max}(dBm) = 10 \cdot \log 10(3.16228 \cdot 10^{-8}$ (mW/MHz)·BWMHz (MHz))

BWMHz is the single carrier bandwidth in MHz.

2.4. Subframe/Slot Structure Applicable to Unlicensed Band System

Figure 22:
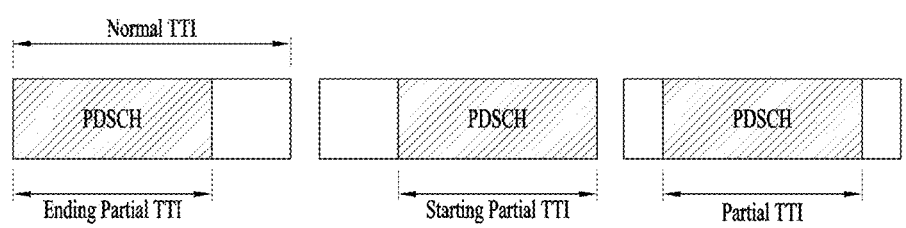
FIG. 22 is a diagram illustrating a partial transmission time interval (TTI) or a partial subframe/slot, which is applicable to the present disclosure.

FIG. 22 illustrates a partial TTI or partial subframe/slot applicable to the present disclosure.

In the Release-13 LAA system, a partial TTI is defined as a DwPTS to maximize use of MCOT and support continuous transmission in a DL burst transmission. The partial TTI (or partial subframe) refers to a period in which a PDSCH signal is transmitted for a length smaller than a legacy TTI (e.g., 1 ms).

In the present disclosure, a starting partial TTI or a starting partial subframe/slot refers to a form in which some front symbols of a subframe are emptied, and an ending partial TTI or ending partial subframe/slot refers to a form in which some symbols at the end of a subframe are emptied. (On the other hand, a whole TTI is called a normal TTI or a full TTI.)

FIG. 22 illustrates various forms of the above-described partial TTI. The first drawing of FIG. 22 illustrates the ending partial TTI (or subframe/slot), and the second drawing of FIG. 22 illustrates the starting partial TTI (or subframe/slot). In addition, the third drawing of FIG. 22 illustrates a partial TTI (or subframe/slot) configured by emptying some symbols at the start and end of the subframe/slot. In this case, a time interval excluding signal transmission in a normal TTI is called a transmission gap (TX gap).

While FIG. 22 has been described in the context of a DL operation, the same thing may be applied to a UL operation. For example, the partial TTI structures illustrated in FIG. 22 may also be applied to PUCCH and/or PUSCH transmission.

3. Proposed Embodiments

The configurations proposed by the present disclosure will be described in more detail based on the technical spirit as described above.

As more and more communication devices require larger communication capacities, efficient use of a limited frequency band becomes a significant requirement. In this context, techniques of using, for traffic offloading, an unlicensed band such as 2.4 GHz mainly used in the legacy WiFi system or 5 GHz and/or 60 GHz which have newly attracted attention are under consideration for a cellular communication system such as 3GPP LTE/NR.

Basically, it is assumed that a wireless signal is transmitted and received between communication nodes in a contention-based manner. Before each communication node transmits a signal in the unlicensed band, the communication node may confirm that another communication node is not transmitting a signal in the unlicensed band by performing channel sensing and performs the signal transmission based on the confirmation. For the convenience of description, this operation is defined as a listen before talk (LBT) operation or a CAP in the present disclosure. The operation of checking whether another communication node is transmitting a signal is referred to as carrier sensing (CS), and determining that another communication node is not transmitting a signal is defined as confirming clear channel assessment (CCA).

In the present disclosure, a BS may perform the DL CAP described in subclause 2.2., for signal transmission in an unlicensed band, and a UE may perform the UL CAP described in subclause 2.3., for signal transmission in the unlicensed band. Further, when it is said that the BS or the UE succeeds in a CAP, this may imply that the BS or the UE determines that the unlicensed band is idle and thus starts to transmit a signal in the unlicensed band at an intended time. On the contrary, when it is said that the BS or the UE fails in the CAP, this may imply that the BS or the UE determines that the unlicensed band is busy and thus does not start to transmit a signal in the unlicensed band at an intended time.

In the present disclosure, signal transmission of a communication device in an unlicensed band in this process is described as performing/transmitting a (DL or UL) transmission using a CAP by the communication device. As such, to transmit a signal in an unlicensed band (referred to as a U-band) in a wireless communication system to which the present disclosure is applicable, the BS or the UE should perform an LBT operation or CAP.

The NR system to which the present disclosure is applicable supports transmission of one or more SS/PBCH blocks. Each SS/PBCH block corresponds to a specific index, and the UE may acquire the index of an SS/PBCH block from sequence information in the SS/PBCH block and/or payload (including a scrambling sequence) loaded in the SS/PBCH block. Accordingly, when the UE identifies the index of the SS/PBCH block from the information in the SS/PBCH block, the UE may identify the time-axis boundary and/or index of a frame/sub-frame/slot from the relationship between predefined SS/PBCH block indexes and time-axis boundaries of frames/subframes/slots. Further, the UE may also identify the index of a frame/sub-frame/slot by combining the information with other information in the SS/PBCH block. Besides, the UE may perform RRM (or RLM) measurement for a neighbor (and/or serving) cell, for mobility support. For this purpose, the UE may perform measurement in each SS/PBCH block of a (neighbor) cell, using the afore-described index information.

However, in view of the nature of an unlicensed band, only when a communication device which intends to transmit a signal succeeds in a CAP in the unlicensed band (or determines that the unlicensed band is idle by the CAP in the unlicensed band), the communication device may attempt to transmit the signal. Due to this characteristic, a BS which intends to transmit an SS/PBCH block in the unlicensed band may not transmit the SS/PBCH block at a determined time. Therefore, when the BS drops the SS/PBCH block transmission, it may take a long time for UE(s) attempting initial access to camp on a cell, and hence it may take a long time for UE(s) attempting serving/neighbor cell measurement to achieve a meaningful measurement result.

Accordingly, the present disclosure proposes a method of increasing transmission occasions of an SS/PBCH block of a BS in consideration of the above characteristic of an unlicensed band. Further, a UE which is to receive an SS/PBCH block may not know when the BS will actually succeed in a CAP and start to transmit the SS/PBCH block. In this context, the present disclosure also proposes a method of eliminating the ambiguity of the transmission timing of an SS/PBCH block, which a UE may suffer from.

In the following description, when it is said that a communication device succeeds/fails in a CAP, this may imply that when transmitting a signal in an unlicensed band by the CAP, the communication device starts/does not start the signal transmission at a predetermined time (because the communication device identifies/determines that the unlicensed band is idle/busy).

Further, an SS/PBCH block will be referred to shortly as an SSB in the following description.

3.1. Method of Transmitting SSB According to Whether CAP is Successful

In the present disclosure, let the maximum number of SSBs transmittable for a predetermined period be denoted by L. Then, the BS may actually select only M SSBs and attempt to transmit the M SSBs, where M is equal to or less than L. Further, to increase SSB transmission occasions provided to the BS in consideration of CAP failure of the BS, a window of a longer duration than a time period in which L SSBs are transmitted may be configured for the BS, and a plurality of transmission candidates available for transmission of an SSB may be provided within the window. The size of the window may be defined as N (i.e., the duration N may correspond to a time period in which L or more SSBs may be transmitted (in TDM)). N may be defined in slots or in time units such as msec.

3.1.1 First SSB Transmission Method (Option 1: Shifted SSB Transmission)

In the First SSB Transmission Method, a Minimum Time Interval Between Available transmission occasions in which transmission of an SSB burst set may start is defined as Lm. Lm may be defined in slots or in time units such as msec.

Figure 23:
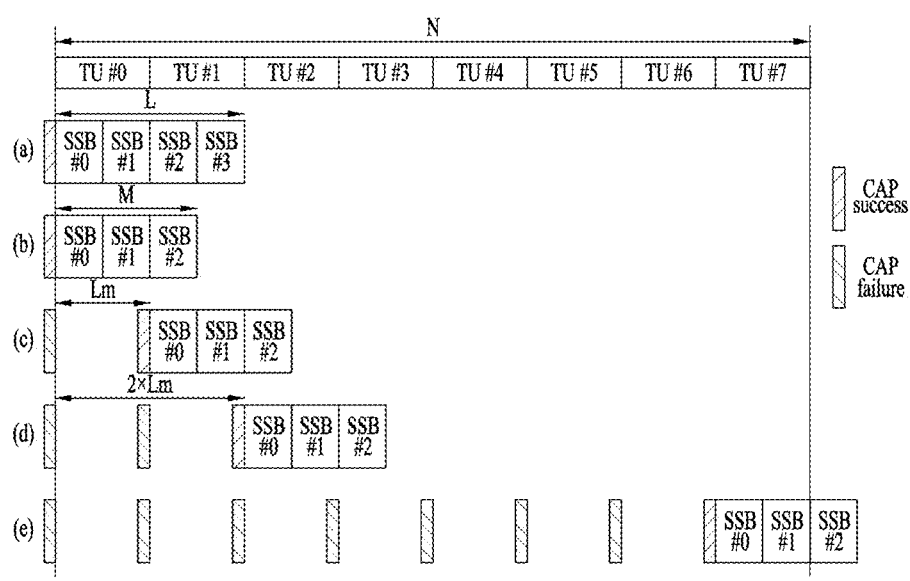
FIGS. 23 to 26 are diagrams illustrating exemplary methods of transmitting a synchronization signal block (SSB) in an unlicensed band by a base station (BS), which are applicable to the present disclosure.

FIG. 23 is a diagram illustrating a first exemplary method of transmitting an SSB in an unlicensed band by a BS, to which the present disclosure is applicable.

In FIG. 23, a block corresponding to one SSB may be equal to or larger than an actual time area occupied by the SSB, and the remaining resource area of the block, which is not occupied by the SSB, may include a DL signal/channel (e.g., a CSI-RS, a PDCCH, and/or a PDSCH) other than the SSB. Further, in FIG. 23, various time units (TUs) applicable to the present disclosure may be used. For example, a TU may be a unit time such as a slot, a half-slot, or 1 msec. Lm and N may be predefined separately by signaling or configured by UE-specific or cell-specific RRC signaling (or PHY or MAC signaling).

Therefore, when the BS fails in a CAP for an SSB transmission starting at time t, the BS may additionally attempt a CAP for an SSB transmission starting at time t+L1*N (N is a natural number).

According to an embodiment applicable to the present disclosure, N=8 TUs, L=4, M=3, and Lm=1 TU in FIG. 23.

(a) of FIG. 23 illustrates an SSB transmission configuration of a BS, for L=4, compared to (b) to (e) of FIG. 23.

(b) of FIG. 23 illustrates a configuration of transmitting an SSB burst set from TU #0 which is the starting time of N by a BS, for M=3.

(c) of FIG. 23 illustrates a configuration of, when the BS fails in a CAP for transmission at the starting time of TU #0, transmitting an SSB burst set from the next occasion TU #1 (TU #0+Lm) by the BS after the BS succeeds in the CAP.

(d) of FIG. 23 illustrates a configuration of, when the BS fails in a CAP for transmission at the starting time of TU #0/1, transmitting an SSB burst set from the next occasion TU #2 (TU #1+Lm) by the BS after the BS succeeds in the CAP.

(e) of FIG. 23 illustrates a configuration of, when the BS fails in a CAP for transmission at the starting time of TU #0/1/2/3/4/5/6, transmitting an SSB burst set from the next occasion TU #7 by the BS after the BS succeeds in the CAP.

When the BS starts to transmit an SSB burst in TU #7 as illustrated in (e) of FIG. 23, the BS may transmit some SSB outside a window of a size N. As such, when the BS starts to transmit an SSB burst in a specific occasion within a window of a size N, with some SSB outside the window of the size N, the BS may transmit the SSB burst as follows. The following SSB transmission methods are applicable in the same manner for a second SSB transmission method which will be described later as well as for the case where Lm>=L.

Method 1: In the case where the BS starts SSB transmissions in a corresponding occasion, even though an SSB is outside a window of a size N, the BS may perform M SSB transmissions. In other words, when the SSB transmissions start in the occasion and the SSB is outside the window of the size N, the BS may be allowed to perform the M SSB transmissions.

Method 2: When an SSB burst to be transmitted by the BS is outside a window of a size N, the BS may drop the SSB burst transmission which starts in a corresponding occasion. In other words, in the above case, the BS may not be allowed to start the SSB burst transmission in the occasion.

Method 3: When an SSB burst to be transmitted by the BS is outside a window of a size N, the BS may drop transmission of SSB(s) outside the window of the size N, while starting to transmit the SSB burst in a corresponding occasion. In other words, the BS may be allowed to start the SSB burst transmission in the corresponding occasion, but not to transmit the SSB(s) outside the window of the size N (e.g., SSB #2 in (e) of FIG. 23).

Figure 24:
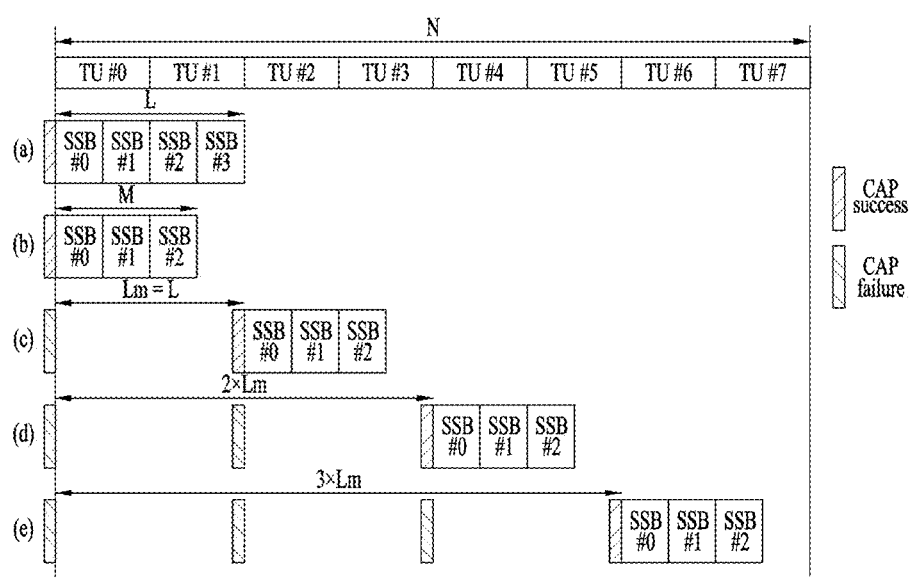

FIG. 24 is a diagram illustrating a second exemplary method of transmitting an SSB in an unlicensed band by a BS, which is applicable to the present disclosure. In FIG. 24, it is assumed that Lm=L. The SSB transmission method of the BS may be given as follows.

(a) of FIG. 24 illustrates a configuration of transmitting SSBs by a BS, for L=4, compared to (b) to (e) of FIG. 24.

(b) of FIG. 24 illustrates a configuration of starting to transmit an SSB burst set in TU #0 which is the starting time of N by the BS, for M=3.

(c) of FIG. 24 illustrates a configuration of, when the BS fails in a CAP for transmission at the starting time of TU #0, starting to transmit an SSB burst set in the next occasion TU #1 (TU #0+Lm) by the BS after the BS succeeds in the CAP.

(d) of FIG. 24 illustrates a configuration of, when the BS fails in a CAP for transmission at the starting time of TU #0/2, starting to transmit an SSB burst set in the next occasion TU #4 by the BS after the BS succeeds in the CAP.

(e) of FIG. 24 illustrates a configuration of, when the BS fails in a CAP for transmission at the starting time of TU #0/2/4, starting to transmit an SSB burst set in the next occasion TU #6 by the BS after the BS succeeds in the CAP.

3.1.2. Second SSB Transmission Method (Option 2: Cyclically Rotated SSB Transmission)

If Lm<L or Lm<M in the above-described first SSB transmission method, the UE may face ambiguity about determining which SSB has been transmitted in a specific SSB occasion. For example, as illustrated in FIGS. 23(b) and 23(c), an SSB transmittable in a leading part of TU #1 (i.e., an early time area of TU #1 in time) may be SSB #0 or SSB #2 according to a time when the BS succeeds in a CAP. However, upon detection of an SSB (particularly, a PSS/SSS) at a corresponding resource position, the UE which has no knowledge of the SSB may additionally have to identify whether the detected SSB is SSB #0 or SSB #2.

According to the later-described second SSB transmission method, this problem may be overcome.

In the second SSB transmission method, Lm is defined as a minimum time interval in which the same SSB (in the following description, the same SSB or the same SSB index may refer to (i) an SSB that the BS transmits using the same Tx beam filter, (ii) an SSB carrying the same partial/whole information, or (iii) an SSB that the UE receives using the same Rx beam filter. In other words, the same SSB or the same SSB index may be interpreted as the same beam or the same beam index or as SSBs in a QCL relationship) may be transmitted. Lm may be defined in slots or in time units such as msec.

In the second SSB transmission method, a value corresponding to Lm and/or N may be predefined separately by signaling or configured by UE-specific or cell-specific RRC (or L1 or MAC) signaling.

The time interval Lm may be equal to or larger than a time period during which at least M (or L) SSBs are transmitted.

The BS may perform a CAP in each SSB, or a minimum SSB interval (e.g., G SSBs where G is a value equal to or larger than 1) in which the BS may perform a CAP may be defined separately. The minimum SSB interval may refer to a minimum time interval in which the BS may perform/attempt a CAP again, when failing in the CAP. G may be predefined separately, or a plurality of candidate values for G may be predefined and one of the candidate values may be selected by the BS (e.g., according to a determined rule).

According to the second SSB transmission method, the BS may start to transmit M SSB burst sets at a time when the BS has succeeded in a CAP, based on occasions in which each SSB is to be transmitted within a window of a size N, which are determined based on Lm.

Figure 25:
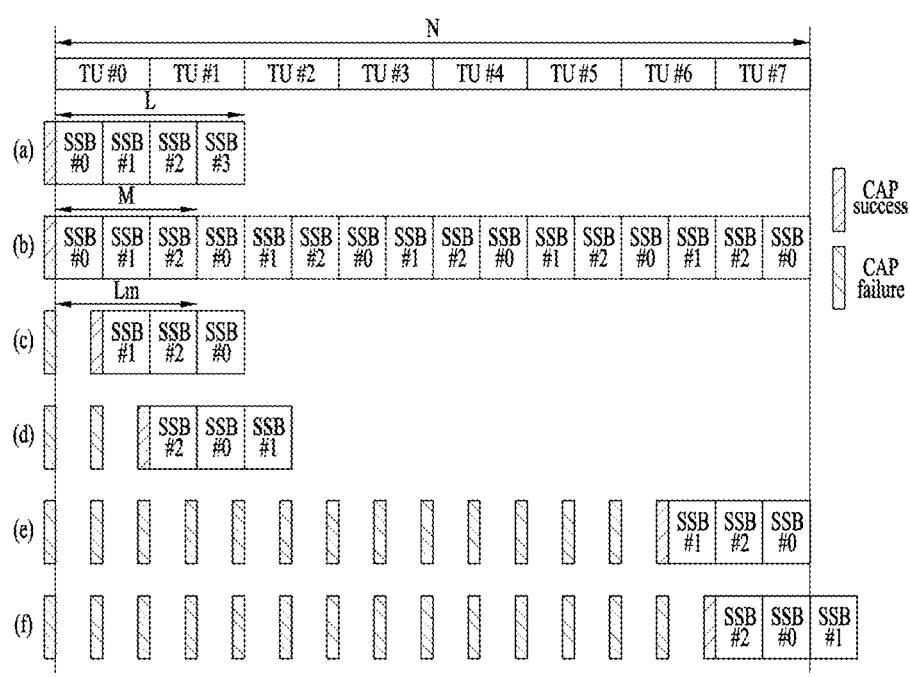

FIG. 25 is a diagram illustrating a third exemplary method of transmitting SSBs in an unlicensed band by a BS, which is applicable to the present disclosure. In FIG. 25, it is assumed that N=8 TUs, L=4, M=3, and Lm=1.5 TU (i.e., a time period during which M SSBs are transmitted).

(a) of FIG. 25 illustrates a configuration of transmitting SSBs by a BS, for L=4, compared to (b) to (f) of FIG. 25.

(b) of FIG. 25 illustrates a configuration of starting to transmit an SSB burst set at the starting time TU #0 of N. Additionally, (b) of FIG. 25 illustrates candidate positions at which SSBs may be transmitted in an interval of Lm.

(c) of FIG. 25 illustrates a configuration of, when the BS fails in a CAP for transmission at the starting time of TU #0, starting to transmit an SSB burst set in the next occasion, i.e., in the middle of TU #0, after the BS succeeds in the CAP.

(d) of FIG. 25 illustrates a configuration of starting to transmit an SSB burst set in TU #1 by the BS, after the BS succeeds in a CAP.

(e) of FIG. 25 illustrates a configuration of starting to transmit an SSB burst set in the middle of TU #6 by the BS, after the BS succeeds in a CAP.

(f) of FIG. 25 illustrates a configuration of starting to transmit an SSB burst set in TU #7 by the BS, after the BS succeeds in a CAP.

When such an SSB transmission method as illustrated in (e) of FIG. 25 is allowed, 6 candidates are available for SSB #0, whereas 5 candidates are available for each of SSB #1 and SSB #2. In other words, the number of available transmissions/a transmission probability may vary according to SSBs.

In this regard, the number of SSB candidates for transmission of each of Lm SSBs may be set to be equal within a window of a size N. That is, in the illustrated case of FIG. 25, SSB #0 allocated to a trailing time of TU #7 may be excluded from the SSB candidates.

However, considering that the BS starts to transmit an SSB burst set in the middle of TU #6 after the BS succeeds in a CAP as illustrated in (e) of FIG. 25, the BS transmits only SSB #1 and SSB #2 sequentially. This SSB transmission may not be allowed either. Therefore, the BS may be allowed to transmit an SSB burst set, only when transmissions of M SSBs are guaranteed. Further, this method may be applied in the same manner, even when Lm>=L.

Further, when the BS starts to transmit an SSB burst in TU #7 as illustrated in (f) of FIG. 25, some SSB may be transmitted outside the N window. In this case, the SSB transmission methods based on the afore-described Method 1, Method 2 and Method 3 may be applied as the SSB burst transmission methods of the BS.

Figure 26:
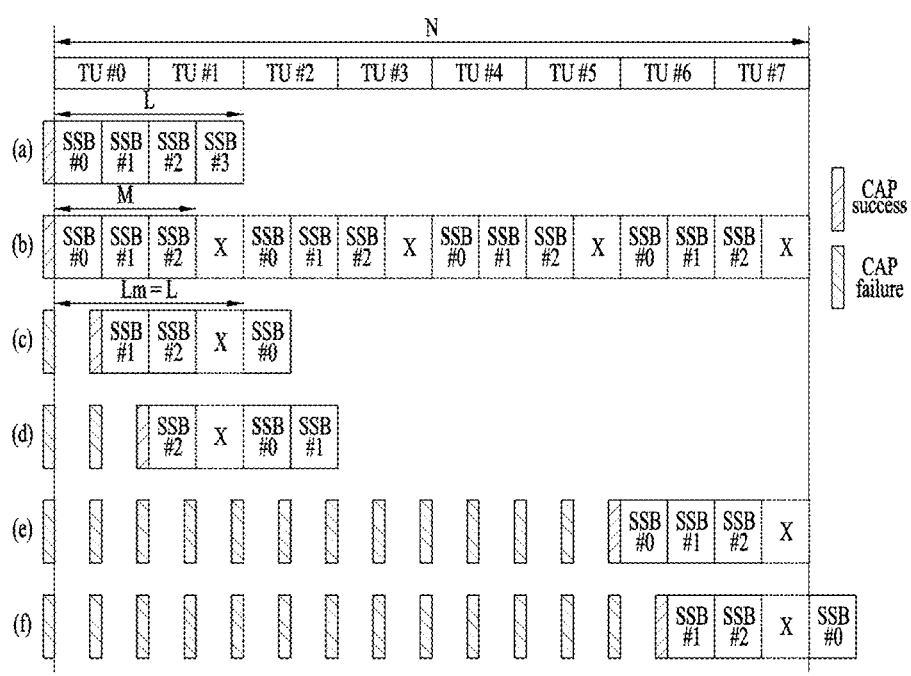

FIG. 26 is a diagram illustrating a fourth exemplary method of transmitting SSBs in an unlicensed band by a BS, which is applicable to the present disclosure. In FIG. 26, it is assumed that Lm=L.

(a) of FIG. 26 illustrates a configuration of transmitting SSBs by a BS, for L=4, compared to (b) to (f) of FIG. 26.

(b) of FIG. 26 illustrates a configuration of starting to transmit an SSB burst set at the starting time of N, TU #0 by the BS, for M=4. (b) of FIG. 26 also illustrates candidate positions available for transmission of each SSB at an interval of Lm. In (b) of FIG. 26, 'X' denotes a duration in which the BS may transmit any signal. The BS may transmit any DL signal/channel or a predefined DL signal/channel in the duration denoted by 'X'. If the BS does not fill the duration 'X' with any DL signal/channel (in other words, the BS does not transmit any signal to a UE in the duration 'X'), the BS should additionally attempt a CAP for a subsequent signal transmission, and thus may start to transmit SSB #n at a time when the CAP is successful.

(c) of FIG. 26 illustrates a configuration in which when a BS fails in a CAP for transmission at the starting time of TU #0, the BS starts to transmit an SSB burst set in the next occasion, that is, in the middle of TU #0 after the BS succeeds in a CAP.

(d) of FIG. 26 illustrates a configuration in which the BS starts to transmit an SSB burst set in TU #1 after the BS succeeds in a CAP.

(e) of FIG. 26 illustrates a configuration in which the BS starts to transmit an SSB burst set in the middle of TU #6 after the BS succeeds in a CAP.

(f) of FIG. 26 illustrates a configuration in which the BS starts to transmit an SSB burst set in TU #7 after the BS succeeds in a CAP.

Particularly, when the SSB burst transmission starts in TU #7 as in the case of (f) of FIG. 26, some SSB may be configured to be transmitted outside an N window. In this case, the BS may transmit the SSB (or a related SSB burst set) outside the N window according to the afore-described SSB burst transmission method. When the transmission of SSB #0 is not allowed, the BS may not perform a signal transmission in a duration 'X'.

If Lm>M SSB transmission durations as in FIG. 26, a transmission duration such as 'X' may be needed. The BS may transmit a specific SSB (i.e., one of SSBs #0, 1# and #2 in the example of FIG. 25 or FIG. 26) in the duration.

For this purpose, the SSB to be transmitted in the duration 'X' may be predefined according to a specific rule (e.g., by a function of SSB #0 or a cell ID) or information about the SSB may be configured for the UE by UE-specific or cell-specific RRC (or L1 or MAC) signaling by the BS.

In the present disclosure, the BS may use an unlicensed band of the NR system as a stand-alone (SA) cell or a non-stand-alone (NSA) cell. In other words, the unlicensed band of the NR system to which the present disclosure is applicable may operate as an SA cell (i.e., a primary cell (PCell)) or an NSA cell (i.e., primary secondary cell group cell (PSCell) or a secondary cell (SCell) for a BS or a UE. In this regard, when the unlicensed band operates as an SA cell in the afore-described first/second SSB transmission method, only Lm=L SSB transmission durations may be allowed.

In the present disclosure, the value of Lm or the number of SSBs related to Lm may be configured/indicated by cell-specific RRC signaling (e.g., a PBCH, RMSI, OSI, or the like) or UE-specific RRC signaling.

More specifically, when Lm is different from L SSB transmission durations (or Lm is equal to fewer SSB transmission durations than L), time positions available for transmission of the same SSB may vary according to the value of Lm or the number of SSBs related to Lm. Therefore, the BS may indicate the value of Lm or the number of SSBs related to Lm to the UE.

In a specific example, the BS may signal the value of Lm or the number of SSBs related to Lm to the UE by PBCH payload. Considering that PBCH payload needs to be minimized to ensure PBCH transmission reliability, the information may be compressed as much as possible and included in the PBCH payload. For example, the BS may indicate an SSB ending index (or the number of SSBs) to the UE. Upon receipt of the SSB ending index (or the number of SSBs), the UE may specifically assume that SSBs with consecutive indexes from SSB index 0 to the signaled SSB ending index (or to the number of SSBs) are transmitted.

According to the afore-described SSB transmission method, the BS should transmit an SSB in each half-TU (e.g., half-slot). According to some embodiments, it may be preferable that the BS transmits one SSB in each TU (e.g., slot). In this case, the BS may transmit only one SSB in a specific slot, with the remaining resource area of the slot multiplexed with RMSI, a CSI-RS, or the like.

In consideration of this SSB transmission method, the BS may signal information about an interval between SSBs in PBCH payload to the UE. For example, the BS may add 1-bit information to the PBCH payload to indicate that when the 1 bit is '0' (or '1'), the interval between SSBs is a half-TU (e.g., half-slot) (or transmission of two SSBs in one slot) or when the 1 bit is '1' (or '0'), the interval between SSBs is a TU (e.g., slot) (or transmission of one SSB in one slot).

This configuration may be generalized such that the BS provides the UE with information about an interval between SSBs or the transmission periodicity of one SSB by PBCH payload (or cell-specific or UE-specific RRC signaling).

Alternatively, the UE may determine/assume the index of an actually transmitted SSB as follows, based on the BS signaling, to the UE, the above-described (i) information about an interval between SSBs or the transmission periodicity of one SSB, and (ii) information about the number of SSBs (for an SSB ending index).

For example, it is assumed that the BS may add 1-bit information to the PBCH payload to indicate that when the 1 bit is '0' (or '1'), the interval between SSBs is a half-TU (e.g., half-slot) (or transmission of two SSBs in one slot) or when the 1 bit is '1' (or '0'), the interval between SSBs is a TU (e.g., slot) (or transmission of one SSB in one slot). If the number of SSBs and the interval between SSBs are signaled as 2 and a half-TU (e.g., half-slot) to the UE, the UE may assume/determine that SSB #0 and SSB #1 are transmitted in one slot. Alternatively, if the number of SSBs and the interval between SSBs are signaled as 2 and a TU (e.g., slot) to the UE, the UE may assume/determine that SSB #0 is transmitted (without SSB #1) in one TU (e.g., slot) and SSB #2 (or SSB #1) is transmitted in the next slot.

It is apparent that an SSB index/the number of SSBs and an SSB transmission periodicity may be signaled by other RRC signaling as well as a PBCH as described before.

When the interval between SSBs is a TU (e.g., slot), this may imply that there may be a difference of up to one TU in the timing synchronization relationship between a serving cell and a neighbor cell.

Additionally, when the BS indicates an SSB transmission pattern for a corresponding cell or a cell of a different frequency to the UE by RRC signaling (other than a PBCH), the following different method may be applied (considering that there may be a further payload margin).

For example, the BS may signal <L-bit bitmap+repetition number> to the UE by other RRC signaling. In a more specific example, signaling of <1000-bit bitmap+repetition number 1> for L=4 may mean that only SSB #0 is transmitted and the value of Lm or the number of SSBs related to Lm is 1 in the afore-described second SSB transmission method. In another example, signaling of <1000-bit bitmap+repetition number 2> for L=4 may mean that only SSB #0 is transmitted and the value of Lm or the number of SSBs related to Lm is 2 in the afore-described second SSB transmission method (i.e., SSB #1 and another SSB are not transmitted in corresponding resources).

If a plurality of candidate positions are available for transmission of one SSB in the afore-described first/second transmission method, the BS may signal, to the UE, a candidate position at which an SSB is actually transmitted among the plurality of candidate positions. The signaling may be performed for the UE in PBCH payload.

The signaling (i.e., signaling of the actual SSB transmission position) may be jointly encoded with signaling of the value of Lm or the number of SSBs related to Lm.

Let the maximum number of candidate positions available for transmission of an SSB within an N window be denoted by Y. For example, if the value of Lm or the number of SSBs related to Lm is 1, the number of candidate positions available for transmission of an SSB may be Y. If the value of Lm is 2, the number of candidate positions available for transmission of an SSB may be Y/2 (or ceiling (Y/2) or floor (Y/2)). Herein, ceiling (Z) represents the smallest integer equal to or larger than Z, and floor (Z) represents the largest integer equal to or smaller than Z. Therefore, the number of bits required to indicate the value of Lm or the number of SSBs related to Lm, and an actual transmission position for each of the SSBs may be given by $$\text{ceiling}\left(\log_2 \sum_{n=1}^{L} \text{flooring}\left(\frac{Y}{n}\right)\right).$$

However, the number of bits is an example applicable to the present disclosure, and the ceiling (or flooring) operation in the equation may be replaced with a flooring (or ceiling) operation.

Additionally, if the value of Lm or the number of SSBs related to Lm is configured/indicated by cell-specific RRC signaling (e.g., a PBCH, RMSI, OSI, or the like) or UE-specific RRC signaling, the BS may signal a specific one of values limited (according to a predetermined rule). For example, if Lm is limited to 4 or 8, the BS may signal 4 or 8 by 1-bit information in cell-specific RRC signaling or UE-specific RRC signaling. In another example, if Lm is limited to an even number (2, 4, 6 or 8), the BS may signal a specific value by 2-bit information in cell-specific RRC signaling or UE-specific RRC signaling. In another example, if Lm is limited to a factor of 8 (0, 2, 4, 6 or 8), the BS may signal a specific value by 2-bit information in cell-specific RRC signaling or UE-specific RRC signaling.

3.2. Cell Acquisition

In the NR system, when the UE succeeds in receiving an SSB, the UE acquires a subframe number (SFN), a frame boundary, a slot boundary, and so on based on the SSB. Subsequently, the UE may receive a PDCCH/PDSCH to receive system information related to the SSB.

However, as described before in subclause 3.1., it may not be guaranteed that the BS transmits a specific SSB at a specific time in view of the nature of an unlicensed band. Therefore, it may be difficult for the UE to acquire related information (e.g., SFN information, frame boundary information, slot index/boundary information, and so on) by receiving the specific SSB.

In this regard, a specific method of acquiring the information in the unlicensed band by the UE will be described in detail in this subclause. The proposed method of the present disclosure may be extended to a method of acquiring information about a cell in which a UE intends to perform measurement (e.g., timing information about the cell), when the UE performs neighbor cell measurement and/or intra-frequency measurement and/or inter-frequency measurement.

3.2.1. First Cell Information Acquisition Method

The BS may provide the UE with frame/slot boundary/index information in PBCH payload of an SSB transmitted in an unlicensed band. Thus, the UE may acquire the frame/slot boundary/index information from the PBCH payload of the SSB transmitted in the unlicensed band.

When the UE is capable of performing PBCH decoding at 'one shot' (or based on a single SSB), this method may be valid. The afore-described various pieces of information may be provided to the UE in various manners. For example, the information may be transmitted fully or partially in a PBCH scrambling sequence or in a DL signal/channel (e.g., system information) multiplexed with an SSB to the UE.

More specifically, it is assumed that Lm<{L (or M) SSB transmission durations} in the afore-described first SSB transmission method, or Lm is determined by a function of M transmission durations as an input value in the afore-described second SSB transmission method. In this case, sequence information about a PBCH DMRS transmitted by the BS may be linked to SSB #0/1/2 as illustrated in FIG. 23 or FIG. 25, and the same PBCH DMRS sequence may be configured irrespective of a TU carrying SSB #0(/1/2) within an N window. Thus, when the UE discovers a PSS/SSS, the UE blind-detects an SSB corresponding to the PBCH DMRS sequence among SSBs #0, 1, 2 and 3 (since L=4, the UE assumes that up to L SSBs may be transmitted until before the UE acquires information about M), and perform PBCH decoding based on the detected DMRS. Accordingly, the UE may acquire frame/slot boundary/index information based on the detected PBCH payload and/or PBCH scrambling sequence.

When the time-domain size of an N window is set to be equal irrespective of the SCS of an SSB, as the SCS increases, the number of SSBs transmittable within the N window may increase. For example, if for a 15-kHz SCS, $N_{SSB}$ SSBs are transmittable within the N window, $2*N_{SSB}$ SSBs are transmittable within the N window, for a 30-kHz SCS. Therefore, as the SCS of an SSB increases, PBCH information required to indicate frame/slot boundary/index information may also increase. For example, if frame/slot boundary/index information may be acquired in 1-bit PBCH payload in the case of a 15-kHz SCS SSB, frame/slot boundary/index information may be acquired in 2-bit PBCH payload in the case of a 30-kHz SCS SSB.

3.2.2. Second Cell Information Acquisition Method

The BS may provide the UE with frame/slot boundary/index information by a DMRS sequence of a PDCCH (and a PDSCH) multiplexed with an SSB transmitted in an unlicensed band. Thus, the UE may acquire the frame/slot boundary/index information from the DMRS sequence of the PDCCH (and the PDSCH) multiplexed with the SSB transmitted in the unlicensed band.

More specifically, it is assumed that Lm<{L (or M) SSB transmission durations} in the afore-described first SSB transmission method, or Lm is determined by a function of M transmission durations as an input value in the afore-described second SSB transmission method. In this case, PBCH DMRS sequence information transmitted by the BS may be linked to SSB #0/1/2 as illustrated in FIG. 23 or FIG. 25, and the same PBCH payload and the same scrambling sequence as well as the same PBCH DMRS sequence may be configured irrespective of a TU carrying SSB #0(/1/2) within an N window.

If it may be assumed that the N window has a periodicity of K msec, the UE may perform PBCH decoding by detecting a DMRS sequence corresponding to SSB #0 through blind detection of the PBCH DMRS within the N window. Although the UE attempts PBCH decoding, a CRC error may occur.

Then, the UE may blind-detect the PBCH DMRS in N windows before and after K msec, and thus detect the DMRS sequence corresponding to SSB #0. In this case, the UE may attempt PBCH combining based on the received signals.

Under circumstances, even though the UE has succeeded in the PBCH decoding, the UE may fail in acquiring an accurate slot boundary and slot index. This is because when the BS transmits an SSB in an unlicensed band as illustrated in FIG. 23, the UE may not distinguish (i-1) a case in which SSB #0 is detected in TU #0 within a first N window and (i-ii) a case in which SSB #0 is detected in TU #2 within an N window after K msec, respectively from (ii-1) a case in which SSB #0 is detected in TU #2 within the first N window and (ii-ii) a case in which SSB #0 is detected in TU #4 within the next N window. Thus, additionally, the UE may detect SSB #0 within an N window after K msec (or the corresponding N window), and blind-detect the DMRS sequence (which may be a function of a slot and/or symbol index) of a PDCCH scheduled to be transmitted in the corresponding TU, thereby finally acquiring slot (and frame) index/boundary information.

When the time-domain size of an N window is configured to be equal irrespective of the SCS of an SSB, as the SCS increases, the number of SSBs transmittable within the N window may increase. For example, if for a 15-kHz SCS, $N_{SSB}$ SSBs are transmittable within the N window, $2*N_{SSB}$ SSBs are transmittable within the N window, for a 30-kHz SCS. Therefore, as the SCS of an SSB increases, PBCH information required to indicate frame/slot boundary/index information may increase. Therefore, as the SCS of an SSB increases, the number of DMRS sequences required to represent frame/slot boundary/index information may increase.

3.2.3. Third Cell Information Acquisition Method

The BS may provide the UE with slot boundary/index information through a PBCH DMRS within an SSB transmitted in an unlicensed band. Thus, the UE may acquire the slot boundary/index information through the PBCH DMRS of the SSB transmitted in the unlicensed band.

More specifically, it is assumed that Lm>=(L SSB transmission durations) in the afore-described first SSB transmission method or Lm is independent of M transmission durations in the afore-described second SSB transmission method. In this case, even though SSBs have the same index (e.g., SSB #0, SSB #1, SSB #2, and so on) in FIG. 24 or FIG. 26, different PBCH DMRS sequences may be defined for the SSBs depending on TUs carrying the SSBs.

In an applicable example, a PBCH DMRS sequence for SSB #0 transmitted in TU #0/2/4/6 may correspond to index #0/4/8/12, respectively. Similarly, a PBCH DMRS sequence for SSB #1 transmitted in TU #0/2/4/6 may correspond to index #1/5/9/13, respectively. Similarly, a PBCH DMRS sequence for SSB #2 transmitted in TU #1/3/5/7 may correspond to index #2/6/10/14, respectively, and a PBCH DMRS sequence for SSB #3 transmitted in TU #1/3/5/7 may correspond to index #3/7/11/15, respectively.

In this case, after PSS/SSS detection, the UE may acquire slot boundary/index information through blind detection of the PBCH DMRS sequence. However, in this case, unlike conventional methods, SFN information and the like may not be provided to the UE by the PBCH.

If the UE succeeds in detecting a sequence corresponding to index #8 of the PBCH DMRS sequence in the first N window, and succeeds in detecting a sequence corresponding to index #4 of the PBCH DMRS sequence in the N window after K msec, the UE may recognize that both SSBs are SSB #0 (assuming that L=4 is predefined), and may acquire SFN information by combining PBCHs included in the two SSBs.

The above method may be applied in the same manner to the case where Lm is determined by a function of M transmission durations in the afore-described second SSB transmission method (e.g., Lm=M).

In another applicable example, different PBCH DMRS sequences may be applied to SSBs depending on TUs carrying the SSBs, even though the SSBs are the same SSB #0(/1/2) in FIG. 25. In a specific example, a PBCH DMRS sequence for SSB #0 transmitted in TU #0/1/3/4/6/7 may correspond to index #0/3/6/9/12/15, respectively, and a PBCH DMRS sequence for SSB #1 transmitted in TU #0/2/3/5/6 may correspond to index #1/4/7/10/13, respectively. Similarly, a PBCH DMRS sequence for SSB #2 transmitted in TU #1/2/4/5/7 may correspond to index #2/5/8/11/14, respectively.

In this case, the UE may acquire slot boundary/index information through blind detection of a PBCH DMRS sequence after PSS/SSS detection. However, in this case, unlike conventional methods, SFN information and the like may not be provided to the UE through the PBCH.

If the UE succeeds in detecting a sequence corresponding to index #6 of the PBCH DMRS sequence in the first N window, and succeeds in detecting a sequence corresponding to index #3 of the PBCH DMRS sequence in the N window after K msec, the UE may recognize that both SSBs are SSB #0 (because the modulo values between DMRS sequence indexes and Lm are equally 0), and acquire SFN information by combining PBCHs included in both SSBs.

In the NR system, three least significant bits (LSBs) of a PBCH DMRS index may be used as a second scrambling code of a PBCH. However, considering that L=4 in the above-described example, only LSB $\log_2$ (L) bits (i.e., 2 bits) of the PBCH DMRS index may be used as the second scrambling code in the present disclosure. Thus, as in the conventional NR system, the UE may acquire SFN information through PBCH combining.

When the time-domain size of the N window is set to be equal regardless of the SCS of an SSB, as the SCS is larger, the number of SSBs transmittable in the N window may increase. For example, if the number of transmittable SSBs within the N window is $N_{SSB}$ for a 15-kHz SCS, $2*N_{SSB}$ SSBs may be transmitted within the N window for a 30-kHz SCS. Therefore, as the SCS of an SSB increases, the number of PBCH DMRS sequences required to indicate frame/slot boundary/index information may increase. For example, if the UE may acquire frame/slot boundary/index information based on N PBCH DMRS sequences in the case of a 15-kHz SCS SSB, frame/slot boundary/index information may be obtained based on 2N PBCH DMRS sequences in the case of a 30-kHz SCS SSB.

3.2.4. Fourth Cell Information Acquisition Method

The BS may provide the UE with slot boundary/index information through a combination of an SSB (or PSS) and a PBCH DMRS, which are transmitted in an unlicensed band. Thus, the UE may acquire the slot boundary/index information through the combination of the SSB (or PSS) and the PBCH DMRS transmitted in the unlicensed band.

More specifically, it is assumed that Lm>=(L SSB transmission durations) in the afore-described first SSB transmission method or Lm is independent of M transmission durations in the afore-described second SSB transmission method. In this case, even though SSBs have the same index (e.g., SSB #0, SSB #1, SSB #2, and so on) in FIG. 24 or FIG. 26, different combinations of SSSs (or PSSs) and PBCH DMRS sequences may be defined for the SSBs depending on TUs carrying the SSBs.

In an applicable example, a PBCH DMRS sequence for SSB #0 transmitted in TU #0/2/4/6 may correspond to index #0/4/0/4, respectively, and a PBCH DMRS sequence for SSB #1 transmitted in TU #0/2/4/6 may correspond to index #1/5/1/5, respectively. Similarly, a PBCH DMRS sequence for SSB #2 transmitted in TU #1/3/5/7 may correspond to index #2/6/2/6, respectively, and a PBCH DMRS sequence for SSB #3 transmitted in TU #1/3/5/7 may correspond to index #3/7/3/7, respectively. In addition, an SSS (or a PSS) corresponding to TU #0/1/2/3 belongs to SSS group A (or PSS group A), and an SSS (or a PSS) corresponding to TU #4/5/6/7 may belong to SSS group B (or PSS group B).

When SSSs made up of 336 sequences are grouped into two groups in the NR system, the number of sequences in each of the groups (e.g., SSS group A and SSS group B) may be 168. After PSS/SSS detection, the UE may then acquire a slot boundary/index by detecting the SSS and blind-detecting a PBCH DMRS sequence. However, in this case, unlike conventional methods, SFN information and the like may not be provided to the UE through a PBCH.

If the UE succeeds in detecting a sequence corresponding to index #0 of a PBCH DMRS sequence and SSS group B in a first N window and detecting a sequence corresponding to index #4 of a PBCH DMRS sequence and SSS group A in an N window after K msec, the UE may recognize that both SSBs are SSB #0 (assuming that L=4 is predefined), and acquire SFN information by combining PBCHs included in the two SSBs.

In the NR system, three LSBs of a PBCH DMRS index may be used as a second scrambling code of a PBCH. However, considering that L=4 in the above-described example, only LSB $\log_2$ (L) bits (i.e., 2 bits) of the PBCH DMRS index may be used as the second scrambling code in the present disclosure. In this manner, as in the conventional NR system, the UE may acquire SFN information through PBCH combining.

3.2.5. Fifth Cell Information Acquisition Method

The BS may provide slot boundary/index information to the UE by a combination of a separate DL signal and a PBCH DMRS transmitted in an unlicensed band. Thus, the UE may acquire the slot boundary/index information from the combination of the separate DL signal and the PBCH DMRS transmitted in the unlicensed band.

According to this method, the BS may multiplex a separate DL signal with an SSB and transmit the multiplexed DL signal and SSB in an unlicensed band. Thus, based on a method similar to the above-described fourth method of acquiring cell information, the UE may acquire slot boundary/index information by combining the DL signal with PBCH DMRS information. The position of a resource (e.g., RE) of the DL signal multiplexed with the SSB may be predefined or determined by a function based on a cell ID or the like.

It is assumed that Lm>={L SSB transmission durations} in the afore-described first SSB transmission method, or Lm is independent of M transmission durations in the afore-described second SSB transmission method. In this case, even though SSBs have the same index (e.g., SSB #0, SSB #1, SSB #2, or the like) in FIG. 24 or FIG. 26, different combinations of DL signals and PBCH DMRS sequences may be defined for the SSBs depending on TUs carrying the SSBs.

In an applicable example, a PBCH DMRS sequence for SSB #0 transmitted in TU #0/2/4/6 may correspond to index #0/4/0/4, respectively. Similarly, a PBCH DMRS sequence for SSB #1 transmitted in TU #0/2/4/6 may correspond to index #1/5/1/5, respectively. Similarly, a PBCH DMRS sequence for SSB #2 transmitted in TU #1/3/5/7 may correspond to index #2/6/2/6, respectively, and a PBCH DMRS sequence for SSB #3 transmitted in TU #1/3/5/7 may correspond to index #3/7/3/7, respectively. Further, a DL signal corresponding to TU #0/1/2/3 may belong to sequence A, and a DL signal corresponding to TU #4/5/6/7 may belong to sequence B.

After PSS/SSS detection, the UE may acquire slot boundary/index information through blind detection of the DL signal and blind detection of the PBCH DMRS sequence. However, in this case, unlike conventional methods, SFN information and the like may not be provided to the UE by the PBCH.

If the UE succeeds in detecting a sequence corresponding to index #0 of a PBCH DMRS sequence and sequence B in a first N window, and succeeds in detecting a sequence corresponding to index #4 of a PBCH DMRS sequence and sequence A in an N window after K msec, the UE may recognize that both SSBs are SSB #0 (assuming that L=4 is predefined), and may acquire SFN information by combining PBCHs included in the two SSBs.

In the NR system, three LSBs of a PBCH DMRS index may be used as a second scrambling code of a PBCH. However, considering that L=4 in the above-described example, only LSB $\log_2$ (L) bits (i.e., 2 bits) of the PBCH DMRS index may be used as the second scrambling code in the present disclosure. Thus, the UE may acquire SFN information through PBCH combining as in the conventional NR system.

3.3. RRM Measurement

The BS may request the UE to perform RRM measurement for a serving cell and a neighbor cell to support the mobility of the UE. In response to this, the UE may perform RRM measurement for the serving cell and the neighbor cell and report measurement results to the BS.

When the UE performs RRM measurement (e.g., RSRP, RSRQ, or the like) for each cell (or beam), the UE may perform RRM measurement for each cell (or beam) based on an SSB (especially, an SSS and a PBCH DMRS) or based on a CSI-RS.

In this subclause, if an SSB is transmitted in an unlicensed band according to various methods (e.g., when the SSB is transmitted in the unlicensed band according to various SSB transmission methods including the SSB transmission method proposed in subclause 3.1), a method of performing RRM measurement for each cell (or beam) based on a corresponding SSB by a UE will be described in detail.

In the following description, it is assumed that a UE has basically acquired time/frequency synchronization for RRM measurement for a neighbor cell and/or a serving cell.

The following RRM measurement methods may be extended to measurement methods for RLM and/or beam management.

3.3.1. First RRM Measurement Method

After blind detection of an SSB index within an N window, the UE may perform measurement on SSB quality corresponding to the same SSB index.

For example, when Lm<{L (or M) SSB transmission durations} as illustrated in FIG. 23, the UE may not actually know what SSB is transmitted (that is, the index of the SSB to be transmitted) after the first M durations of the N window. Thus, the UE may perform RRM measurement in the unlicensed band by a corresponding method.

3.3.2. Second RRM Measurement Method (RRM Measurement Method Based on Shifted SSB Transmission)

When Lm=>{L SSB transmission durations} as illustrated in FIG. 24, the index of an SSB transmitted at a specific time point within an N window may be fixed. Accordingly, unlike the above-described first RRM measurement method, the UE may perform measurement on SSB quality corresponding to the same SSB index without blind detection of the SSB index.

Alternatively, as described before in the third/fourth/fifth cell acquisition method, a different PBCH DMRS sequence (or SSS sequence or the sequence of a separate DL signal) may be configured even for the same SSB depending on a transmitted TU.

For example, it is assumed that a PBCH DMRS sequence corresponding to SSB index #0 is applied to an SSB transmitted in a first TU within an N window, and a PBCH DMRS sequence corresponding to SSB index #4 is applied to an SSB transmitted in a third TU within an N window after K msec, as illustrated in FIG. 24. When the UE detects the two SSBs and the PBCH DMRS sequences applied to the two SSBs, the UE may recognize that the two SSBs are identical based on L=4, and thus may apply L1(/L3) filtering to a measurement result corresponding to SSB index #0 within the first N window and a measurement result corresponding to SSB index #4 within the next N window.

3.3.3. Third RRM Measurement Method (RRM Measurement Method Based on Cyclically Rotated SSB Transmission)

Even though Lm is determined by a function based on M transmission durations as illustrated in FIG. 25, or Lm is independent of M transmission durations as illustrated in FIG. 26, the UE needs to know M and/or Lm of a neighbor cell to perform RRM measurement without blind detection of an SSB index. Now, a detailed description will be given of a method of performing RRM measurement in an unlicensed band, when information about a neighbor cell is provided to a UE. In the following description, 'M' may be replaced with 'Lm' according to an embodiment.

(1) Alt 1

The BS may signal M for each cell ID to the UE (e.g., by cell-specific RRC signaling, SIB3, or SIB4). In response to this, the UE may acquire cell ID information by PSS/SSS detection and perform measurement (without ambiguity about an SSB index) at a specific time point in an N window based on an M value corresponding to a corresponding cell ID.

When the BS signals Lm to the UE in this manner, the BS may use a method of signaling one of values limited (by a certain constraint) to the UE.

For example, when M is limited to 4 or 8 (by a specific condition or the like), the BS may signal to the UE whether Lm is 4 or 8 using 1-bit information by cell-specific RRC signaling or UE-specific RRC signaling.

In another example, when M is limited to an even number (e.g., 2 or 4 or 6 or 8) (by a specific condition or the like), the BS may signal a specific Lm value among the four values using 2-bit information by cell-specific RRC signaling or UE-specific RRC signaling.

When M is limited to a divisor of 8 (e.g., 1 or 2 or 4 or 8) (by a specific condition or the like), the BS may signal a specific Lm value among the four values using 2-bit information by cell-specific RRC signaling or UE-specific RRC signaling.

(2) Alt 2

It is assumed that although the UE has acquired an M value corresponding to a cell ID from the BS based on the above-described method (e.g., Alt 1 or the like), the UE discovers a cell ID for which an M value has not been indicated to the UE. In this case, it may be regulated that the UE assumes a specific M value (e.g., M=8, the maximum of available M values, or the M value of a serving cell). Further, even though the UE has been configured to report a beam level quality (i.e., a quality for each beam index), the UE may have difficulty in performing beam-level RRM measurement for the cell ID because an accurate M value corresponding to the cell ID has not been configured for the UE. Therefore, it may be regulated that the UE reports only a measured cell-level quality when reporting an RRM measurement corresponding to a cell ID, and report a specific value (e.g., a value corresponding to a lowest quality) when reporting a beam-level quality.

(3) Alt 3

The UE may perform measurement on the assumption that the M value of a neighbor cell is equal to the M value of a serving cell.

(3-1) Alt 3a

The BS may signal not only the M value of the serving cell but also a separate S value to the UE. In response to this, the UE may perform measurement, assuming that every (intra-frequency) neighbor cell for which (intra-frequency) measurement is to be performed actually transmits S SSBs. S may be set separately for each frequency for inter-frequency measurement. It may be regulated that if S is not signaled to the UE, the UE may assume a specific S value (e.g., S=8, or the maximum of available S values).

(3-2) Alt 3b

The BS may signal to the UE whether the M value of a serving cell and the M value of a neighboring cell may be assumed to be equal by cell-specific RRC signaling (e.g., a PBCH, RMSI, OSI, or the like) or UE-specific RRC signaling.

If the BS signals to the UE that the M value of the serving cell and the M value of the neighboring cell may be assumed to be equal, the UE may actually operate in the same manner as Alt 3. On the contrary, when the BS signals to the UE that the M value of the serving cell and the M value of the neighboring cell may not be assumed to be equal, the UE may actually operate in the same manner as Alt 2.

(4) Alt 4

The UE may report a measured value obtained by applying averaging only to an SSB detected at a specific time point within an N window to the BS.

For example, there may be 16 SSB occasions in the N window, as illustrated in FIG. 25. The UE may then apply averaging to each of the 16 occasions in every N window and then report corresponding (up to) 16 measurement values. Specifically, the UE may report L1-filtered corresponding (up to) 16 measurement values to a higher layer of the UE, and report a measurement result for each beam/cell (after L3 filtering) to the BS through the higher layer.

(5) Alt 5

The UE may directly obtain an M value (related to a neighbor cell) by decoding system information which has been multiplexed and transmitted with an SSB by the neighbor cell. The UE may acquire cell ID information by PSS/SSS detection, and perform measurement (without ambiguity about an SSB index) at a specific time point in an N window based on an M value corresponding to the cell ID.

(6) Alt 6

The BS (preferably, the serving cell) may signal to the UE the number of beam indexes, SSB indexes, or PBCH DMRS sequence indexes that may be assumed when the UE performs (neighbor cell) measurement. In response to this, when K is indicated as the number of SSB indexes to the UE, the UE may perform measurement in an SSB corresponding to an SSB index (a PBCH DMRS sequence index or an index derived by combining a PBCH DMRS sequence with PBCH payload) {0, 1, . . . , K−1} in a specific measurement window (e.g., a discovery signal measurement timing configuration (DMTC): if a DL burst including at least an SSB burst set is defined as a discovery signal or discovery reference signal (DRS), a DMTC for RRM or RLM measurement may be (individually) configured).

(7) Alt 7

The BS (preferably, the serving cell) may signal to the UE a beam index, an SSB index, a PBCH DMRS sequence index, or an index derived by combining a PBCH DMRS sequence with PBCH payload, which may be assumed for (neighbor cell) measurement. For example, the information may include L-bit bitmap information. When the information includes 4-bit bitmap information and the UE receives bitmap information [1 0 1 0], the UE may perform measurement in SSB index #0/2 (beam index #0/2, PBCH DMRS index #0/2, or index #0/2 derived by combining a PBCH DMRS sequence with PBCH payload) during an N window.

(8) Alt 8

The BS may signal to the UE timing information based on which (neighbor cell) measurement is to be performed in a measurement window (e.g., DMTC). For example, the information may include L-bit bitmap information. When the information includes 4-bit bitmap information and the UE receives bitmap information [1 1 0 0], the UE may perform measurement only at positions corresponding to '1' based on bitmap information obtained by repeating the received bitmap information a plurality of times during an N window (e.g., bitmap information [1 1 0 0 1 1 0 0 1 1 0 0 . . . ] where the number of SSB candidate positions in the N window may be equal to the number of components in the corresponding bitmap repetition array).

In this case, the UE may perform measurement, assuming all beam indexes (SSB indexes, PBCH DMRS sequence indexes, or indexes derived by combining PBCH DMRS sequences with PBCH payload) at the positions corresponding to '1' (hereinafter, an operation similar to the corresponding operation is referred to as OPT1).

Alternatively, the UE may perform measurement for SSB index #0 (beam index #0, PBCH DMRS sequence index #0, or index #0 derived by combining a PBCH DMRS sequence with PBCH payload) at positions where the first bit of the 4-bit bitmap is repeated, and for SSB index #1 (beam index #1, PBCH DMRS index #1, or index #1 derived by combining a PBCH DMRS sequence with PBCH payload) at positions where the second bit of the 4-bit bitmap is repeated (hereinafter, an operation similar to the corresponding operation is referred to as OPT2).

Alternatively, the UE may map each bit of the 4-bit bitmap information to a beam index (SSB index, PBCH DMRS sequence index, or an index derived by combining a PBCH DMRS sequence with PBCH payload) and perform measurement for SSB index #0/1 (beam index #0/1, PBCH DMRS index #0/1, or index #0/1 derived by combining a PBCH DMRS sequence with PBCH payload), wherein the UE may perform measurement only at positions corresponding to '1' in repeated bitmap information (hereinafter, an operation similar to the corresponding operation is called OPT3).

(9) Alt 9

The BS (preferably, the serving cell) may signal to the UE timing information and the number of beam indexes (SSB indexes, PBCH DMRS sequence indexes, or indexes derived by combining PBCH DMTS sequences with PBCH payload) for (neighbor cell) measurement within a measurement window (e.g., DMTC). For example, the information may include L-bit bitmap information and M. For example, when L=4, the UE may receive signaling of bitmap information [1 1 0 0] and M=3 from the BS. In response to this, the UE may perform measurement only at positions corresponding to '1' based on bitmap information generated by repeating only the first 3-bit information of the corresponding bitmap information during an N window (e.g., [1 1 0 1 1 0 1 1 0 . . . ] where the number of SSB candidate positions in the N window may be equal to the number of components in the array).

In this case, the UE may perform measurement, assuming all beam indexes (SSB indexes, PBCH DMRS sequence indexes, or indexes derived by combining PBCH DMRS sequences with PBCH payload) at the positions corresponding to each '1' value (hereinafter, an operation similar to the corresponding operation is referred to as OptA).

Alternatively, the UE may perform measurement for SSB index #0 at positions where the first bit of the 4-bit bitmap is repeated (beam index #0, PBCH DMRS index #0, or index #0 derived by combining a PBCH DMRS sequence with PBCH payload), and for SSB index #1 at positions where the second bit of the 4-bit bitmap is repeated (beam index #1, PBCH DMRS index #1, or index #1 derived by combining a PBCH DMRS sequence with PBCH payload) (hereinafter, an operation similar to the corresponding operation is referred to as OptB).

Alternatively, the UE may map each bit of the 4-bit bitmap information to a beam index (SSB index, PBCH DMRS sequence index, or an index derived by combining a PBCH DMRS sequence with PBCH payload) and perform measurement for SSB index #0/1 (beam index #0/1, PBCH DMRS index #0/1, or index #0/1 derived by combining a PBCH DMRS sequence with PBCH payload), wherein the UE may perform measurement only at positions corresponding to '1' in repeated bitmap information (hereinafter, an operation similar to the corresponding operation is called OptC).

3.3.4. Fourth RRM Measurement Method

When Lm is independent of M transmission durations as illustrated in FIG. 26, the index of an SSB to be transmitted at a specific time point in an N window may be fixed. Therefore, unlike the afore-described first RRM measurement method, the UE may perform measurement on an SSB quality corresponding to the same SSB index without blind-detection of the SSB index.

Alternatively, as described before in the third/fourth/fifth cell acquisition method, a different PBCH DMRS sequence (a different SSS sequence or a different sequence of a separate DL signal) may be configured even for the same SSB depending on a transmitted TU.

For example, it is assumed that a PBCH DMRS sequence corresponding to SSB index #0 is applied to an SSB transmitted in a first TU within an N window, and a PBCH DMRS sequence corresponding to SSB index #4 is applied to an SSB transmitted in a third TU within an N window after K msec, as illustrated in FIG. 26. When the UE detects the two SSBs and the PBCH DMRS sequences applied to the two SSBs, the UE may recognize that the two SSBs are identical based on L=4, and thus may apply L1(/L3) filtering to a measurement result corresponding to SSB index #0 within the first N window and a measurement result corresponding to SSB index #4 within the next N window.

3.4. Additional Applicable Examples

According to some embodiments, the following may be additionally applied to the various configurations described above.

3.4.1. First Additional Example

As illustrated in FIG. 25, when Lm is determined based on M transmission durations, a neighbor cell and a serving cell may not be synchronized exactly. In this case, even though the UE successfully detects an SSB of the specific neighbor cell within an N window, the UE may face ambiguity about the next SSB position.

For example (when Case A or Case C is assumed from among SSB transmission methods of the NR system: see subclause 1.5. for details), when the UE discovers SSB #2 in the first half-slot of TU #1 of the neighbor cell, the next SSB candidate position of the neighbor cell may be symbol index #8 spaced from the ending symbol of SSB #2 by 2 symbols. When the UE discovers SSB #2 in the second half-slot of TU #5 of the neighbor cell, the next SSB candidate position of the neighbor cell may be symbol index #2 in a TU (e.g., TU #6) spaced from the ending symbol of SSB #2 by 4 symbols. However, it may be difficult for the UE to acquire information about M transmission durations for the neighbor cell. Thus, even though the UE discovers SSB #2, the UE may have ambiguity about the next SSB position.

To solve this problem, restrictions/constraints may be imposed on the index of an SSB transmitted in a first half TU (e.g., half-slot) in the unlicensed band, and the index of an SSB transmitted in the second half TU. For example, the index of the SSB transmitted in the first half TU may be set to an even value, and the index of the SSB transmitted in the second half TU may be set to an odd value. Alternatively, the index of a PBCH DMRS sequence transmitted in the first half TU may be set to an even value, and the index of a PBCH DMRS sequence transmitted in the second half TU may be set to an odd value.

If the SSB index or PBCH DMRS sequence index detected by the UE for a specific neighbor cell is an even value, the UE may recognize that the SSB is the SSB transmitted in the first half TU, and additionally, the next SSB candidate position of the neighbor cell is a symbol apart from the ending symbol of the corresponding SSB by 2 symbols.

3.4.2. Second Additional Example

For a licensed band of the NR system, L is preset band-specifically. For example, L=4 for a band of 3 GHz or less, L=8 for a band of 6 GHz or less, and L=64 for a band of 6 GHz or more.

However, for an unlicensed band of the NR system, which is operable in a frequency band of 7 GHz or less (so called a sub-7 GHz band), the L value may be defined differently from the previous example. Therefore, according to the present disclosure, L may be defined based on one or more of the following options (or combinations of options).

(1) Opt. 1: L may be set to a value which allows transmission of L SSBs for Y msec (e.g., Y=1).

For example, when Y=1, L=2 for a 15-kHz SCS, L=4 for a 30-kHz SCS, and L=8 for a 60-kHz SCS.

(2) Opt. 2: Different L values may be defined according to SCSs.

For example, L=2 for the 15-kHz SCS, L=4 for the 30-kHz SCS, and L=8 for the 60-kHz SCS.

(3) Opt. 3: Different L values may be defined according to frequency bands.

For example, L=2 in a band of 5150 to 5250 MHz, and L=4 in a band of 5250 to 5350 MHz.

Unlike the above-described example, for the unlicensed band of the NR system, even though L is set equal to that of the NR system, the maximum value of M (i.e., L or fewer SSBs actually transmitted by the BS) may be limited. Based on the rules of Opt. 1 to Opt. 3, the maximum value of M, not the L value, may be determined.

If an SSB (or a part of the SSB, for example, a PSS) needs to be repeatedly transmitted even within one N window in an unlicensed band, an association may be required between the repetition number of the SSB and L or M. For example, when an SSB (or a part of the SSB, for example, a PSS) is to be transmitted repeatedly X times in one N window in the unlicensed band, L or M may be limited to a multiple of X.

Additionally, a different L value (or a different maximum value of M) may be defined depending on whether the unlicensed band operates as an SA cell (e.g., PCell) or an NSA cell (e.g., PSCell or SCell). For example, if the unlicensed band is an SA cell, the L value (or the maximum value of M) may be defined as 4, whereas when the unlicensed band is an NSA cell, the L value (or the maximum value of M) may be defined as 8 (similarly to the licensed band of the NR system).

3.4.3. Third Additional Example

Figure 27:
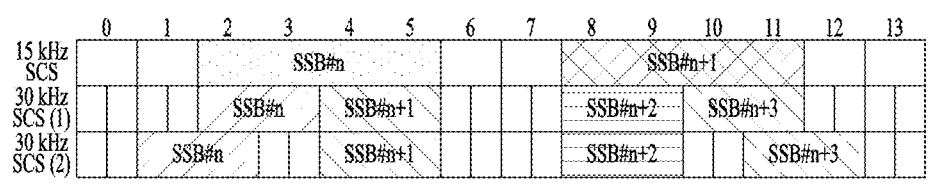

FIG. 27 is a simplified diagram illustrating the configuration of an SSB transmitted in a licensed band of an NR system.

In the NR system, for the 15/30-kHz SCS, SSB transmission symbols may be determined as illustrated in FIG. 27.

That is, for the 15-kHz SCS, one SSB may be transmitted in symbol #2/3/4/5 in one TU (e.g., slot), and another SSB may be transmitted in symbol #8/9/10/11 in the same TU. For the 30-kHz SCS, two patterns may be applied as illustrated in FIG. 27. When the interval between SSB #n and SSB #n+1 is interval #n, and the interval between SSB #n+1 and SSB #n+2 is interval #n+1, interval #n and interval #n+1 are not equal in both patterns. That is, for the 15-kHz SCS and the 30-kHz SCS (2), interval #n is 2 symbols, interval #n+1 is 4 symbols, and for the 30-kHz SCS (1), interval #n is 0 symbol and interval #n+1 is 4 symbols.

On the other hand, considering the characteristics of the unlicensed band in which an SSB may actually be transmitted at a different position according to a CAP result of the BS, the UE may detect a specific SSB and attempt to detect an SSB expected to be transmitted next based on the detected SSB. In this case, if the interval between SSBs is not constant, it may be difficult for the UE to determine the transmission time of the next SSB.

Therefore, the present disclosure proposes a method of configuring a constant SSB transmission interval in an unlicensed band.

Figure 28:
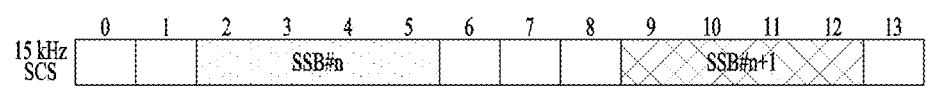
FIG. 28 is a simplified diagram illustrating SSB transmission patterns in an unlicensed band according to an example of the present disclosure.
Figure 28:
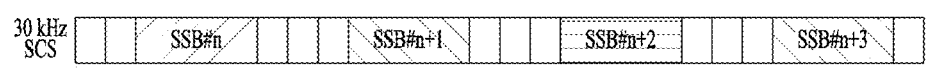

FIG. 28 is a simplified diagram illustrating SSB transmission patterns in an unlicensed band according to an example of the present disclosure.

As illustrated in FIG. 28, the interval between SSBs transmitted in the unlicensed band may be set to a constant value, 3 symbols.

However, FIG. 28 is a mere example applicable to the present disclosure. In another example, the configuration of transmitting SSB #n in symbol #3/4/5/6 (#0/1/2/3 or #1/2/3/4) and transmitting SSB #n+1 3 symbols later may also be applied to the present disclosure.

Figure 29:
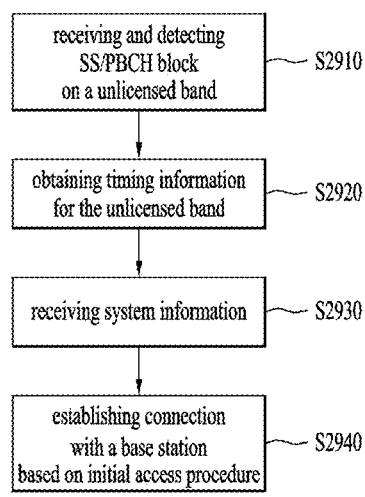
FIG. 29 is a flowchart illustrating an operation of a UE, which is applicable to the present disclosure.
Figure 30:
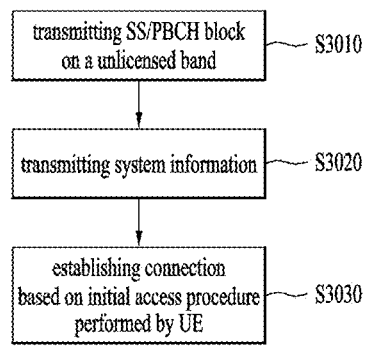
FIG. 30 is a flowchart illustrating an operation of a BS, which is applicable to the present disclosure.
Figure 31:
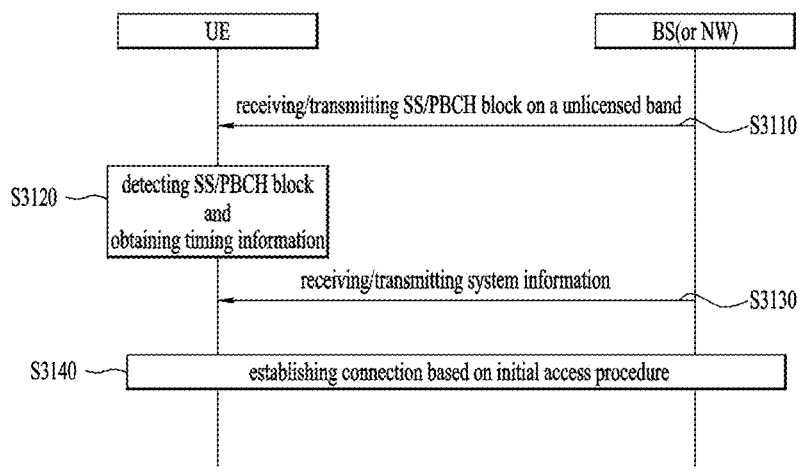
FIG. 31 is a diagram illustrating operations of a UE and a BS, which are applicable to the present disclosure.

FIG. 29 is a flowchart illustrating an operation of a UE, which is applicable to the present disclosure, FIG. 30 is a flowchart illustrating an operation of a BS, which is applicable to the present disclosure, and FIG. 31 is a diagram illustrating operations of a UE and a BS, which are applicable to the present disclosure.

The BS (or network (NW)) may transmit an SS/PBCH block in an unlicensed band to the UE (S3010 and S3110). For this purpose, the BS may perform a CAP for the unlicensed band. More specifically, the BS may transmit the SS/PBCH block in the unlicensed band based on the CAP to the UE.

Herein, the BS may transmit the SS/PBCH block to the UE at one of a plurality of candidate positions available for transmission of the SS/PBCH block based on the CAP. For example, as illustrated in FIGS. 23 to 26, the BS may transmit the SS/PBCH block to the UE at a specific candidate position within the unlicensed band.

The SS/PBCH block may include a PSS, an SSS, and a PBCH.

In response to this, the UE may receive the SS/PBCH block in the unlicensed band from the BS (S2910 and S3110). More specifically, the UE may receive and detect the SS/PBCH block in the unlicensed band (S2910).

The UE may acquire timing information about the unlicensed band based on PBCH payload and a PBCH DMRS, which are included in the PBCH, through the SS/PBCH block detection (S2920 and S3120).

The size of the PBCH payload from which the timing information about the unlicensed band is acquired may be determined based on a numerology applied to the unlicensed band.

For reference, the PBCH DMRS (or DMRS sequence) applicable to the present disclosure may be defined as follows or partially modified based on the following definition.

The UE may assume that the DMRS sequence of the SS/PBCH block (or the PBCH) is given by the following equation.

$$r(m) = \frac{1}{\sqrt{2}}(1 - 2 \cdot c(2m)) + j\frac{1}{\sqrt{2}}(1 - 2 \cdot c(2m+1)) \quad \text{Equation 1}$$

where c(n) is a pseudo-random sequence which may be defined by a length-31 Gold sequence. A scrambling sequence generator may be initialized at the start of an SS/PBCH block occasion by $$c_{init} = 2^{11}(\bar{i}_{SSB}+1)(\lfloor N_{ID}^{cell}/4 \rfloor+1) + 2^6(\bar{i}_{SSB}+1) + (N_{ID}^{cell} \bmod 4) \quad \text{Equation 2}$$

where $N_{ID}^{cell}$ represents a physical layer cell ID related to the BS, and $\bar{i}_{SSB}$ may be determined as follows under circumstances.

When the maximum number $L_{max}$ of SS/PBCH beams within an SS/PBCH period for a specific band is 4 (e.g., the 15/30-kHz SCS is applied to the frequency band of 3 GHz or less), $\bar{i}_{SSB}$ may satisfy the following equation.

$$\bar{i}_{SSB} = i_{SSB} + 4n_{hf} \quad \text{Equation 3}$$

where $n_{hf}$ represents the number of a half-frame carrying the PBCH. For example, $n_{hf}$ may be 0 for the first half-frame of the frame, and 1 for the second half-frame of the frame. In the above equation, $i_{SSB}$ may correspond to two LSBs of an SS/PBCH block index (or the transmission candidate (position) index of the SS/PBCH block).

If the maximum number $L_{max}$ of SS/PBCH beams in an SS/PBCH period for a specific band is 8 (e.g., the 15/30-kHz SCS is applied to the frequency band of 3 GHz or higher), or 64 (e.g., a 120/240-kHz SCS is applied to the frequency band of 3 GHz or higher), $\bar{i}_{SSB}$ may satisfy the following equation.

$$\bar{i}_{SSB} = i_{SSB} \quad \text{Equation 4}$$

where $i_{SSB}$ may correspond to three LSBs of an SS/PBCH block index (or the transmission candidate (position) index of the SS/PBCH block).

In the present disclosure, the timing information about the unlicensed band may include at least one of the following pieces of information in the present disclosure.

(i) Frame boundary of the unlicensed band
(ii) Slot boundary of the unlicensed band
(iii) Frame index of the unlicensed band
(iv) Slot index of the unlicensed band When a first numerology corresponding to the 15-kHz SCS is applied to the unlicensed band, the size of the PBCH payload from which the timing information about the unlicensed band is acquired may be set to 1 bit.

In another example applicable to the present disclosure, when a second numerology corresponding to the 30-kHz SCS is applied to the unlicensed band, the size of the PBCH payload from which the timing information about the unlicensed band is acquired may be set to 2 bits.

In this case, the number of candidate positions available for transmission of the SS/PBCH block based on the second numerology being applied to the unlicensed band may be set to twice the number of candidate positions available for transmission of the SS/PBCH block based on the first numerology being applied to the unlicensed band.

Further, a time duration in which candidate positions available for transmission of the SS/PBCH block are configured may be set to be equal irrespective of a numerology applied to the unlicensed band.

In the present disclosure, the DMRS sequence for the PBCH may be configured in association with one of (i) the index of the received SS/PBCH block and (ii) information about the transmission position of the received SS/PBCH block (e.g., an SS/PBCH block transmission candidate index or an SS/PBCH block transmission position index).

In the present disclosure, the UE may detect corresponding DMRS sequence information by blind detection of the DMRS sequence for the PBCH, and decode PBCH payload in the SS/PBCH block based on the DMRS sequence information.

In the present disclosure, the SS/PBCH block may be received at one of a plurality of candidate positions available for transmission of the SS/PBCH block in the unlicensed band.

Additionally, the UE may perform initial access to the BS based on (i) the acquired timing information and (ii) the received SS/PBCH block.

More specifically, the UE may acquire system information from the BS based on the SS/PBCH block and so on. For example, the UE may acquire an MIB on the PBCH included in the SS/PBCH block, and additionally receive system information such as RMSI or SIB1 based on the SS/PBCH block (S2930 and S3130).

In response to this, the BS may transmit the system information (e.g., RMSI, SIB1, or the like) related to the SS/PBCH block (S3020 and S3130).

The UE may perform initial access to the BS by using the system information or the like and establish a connection with the BS by the initial access (S2940 and S3140). In response to this, the BS may establish the connection with the UE according to the initial access (S3030 and S3140).

Unless contradicting with each other, all of the afore-described examples (described before with reference to FIGS. 29, 30 and 31) may be implemented in combination. In other words, the UE and the BS according to the present disclosure may perform operations of a combination of two or more of the afore-described examples (particularly, described before with reference to FIGS. 29, 30 and 31), unless contradicting with each other.

Further, when performing all of the afore-described examples (particularly, described before with reference to FIGS. 29, 30 and 31), the UE may monitor a PDCCH signal only during a predetermined time period based on DRX mode. In other words, the BS according to the present disclosure may configure the DRX mode for the UE, and the UE may perform the afore-described operations by monitoring the PDCCH signal (i.e., discontinuously) only during a predetermined time period based on the configured DRX mode.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 32:
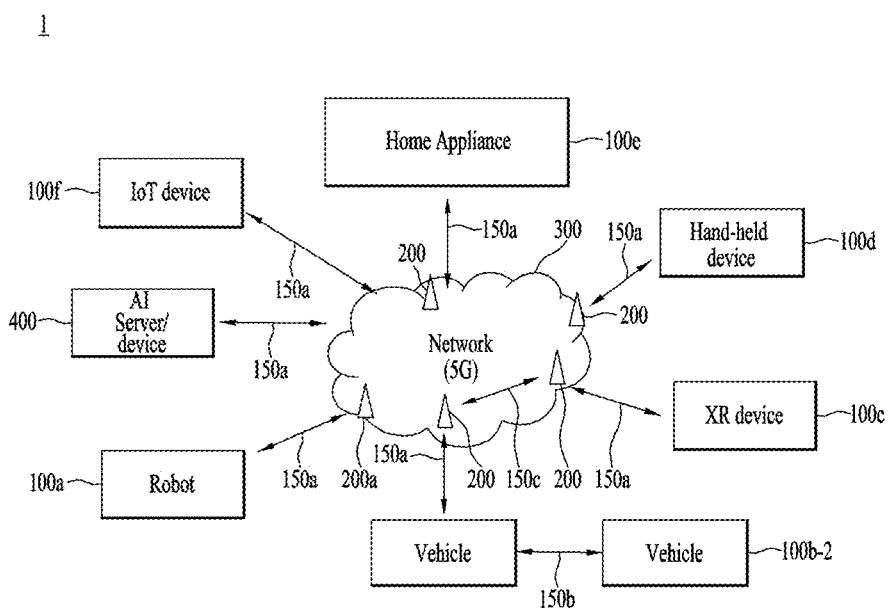
FIG. 32 illustrates a communication system applied to the present disclosure.

FIG. 32 illustrates a communication system 1 applied to the present disclosure.

Referring to FIG. 32, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

5. Example of Wireless Devices to which the Present Disclosure is Applied

Figure 33:
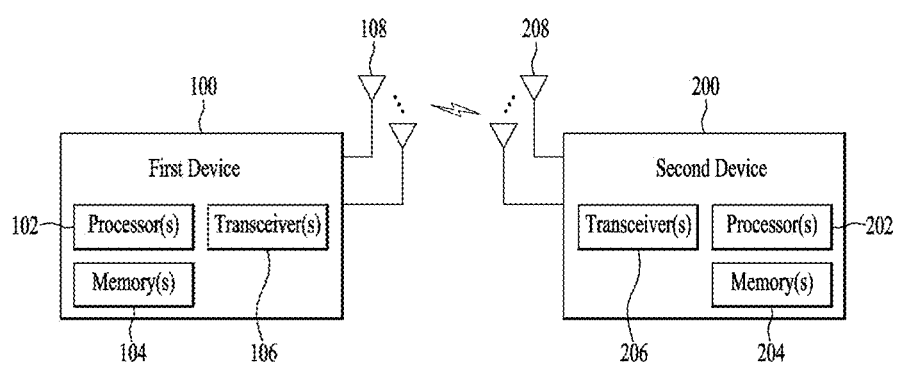
FIG. 33 illustrates wireless devices applicable to the present disclosure

FIG. 33 illustrates wireless devices applicable to the present disclosure.

Referring to FIG. 33, a first wireless device 100 and a second wireless device 200 may transmit radio signals through a variety of RATs (e.g., LTE and NR). Herein, (the first wireless device 100 and the second wireless device 200) may correspond to (the wireless device 100x and the BS 200) and/or (the wireless device 100x and the wireless device 100x) of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 34:
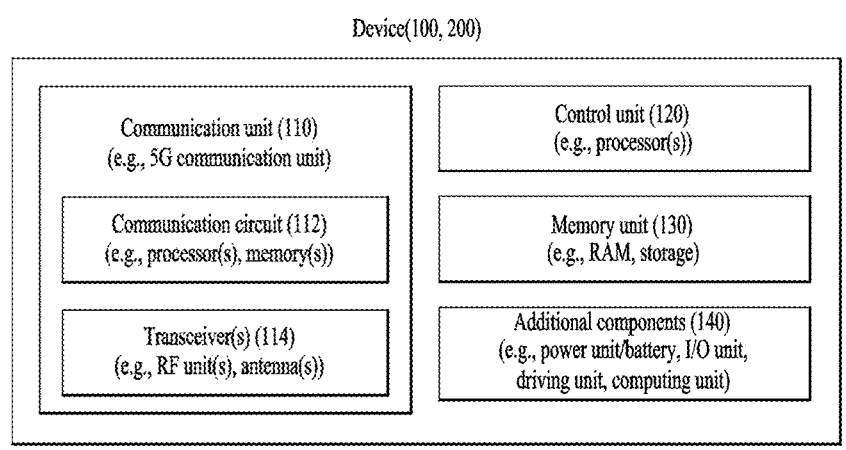
FIG. 34 illustrates another example of a wireless device applied to the present disclosure.

6. Example of Using Wireless Device to which the Present Disclosure is Applied FIG. 34 illustrates another example of a wireless device applied to the present disclosure. The wireless device may be implemented in various forms according to a use-case/service (refer to FIG. 32).

Referring to FIG. 34, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 32), the vehicles (100b-1 and 100b-2 of FIG. 32), the XR device (100c of FIG. 32), the hand-held device (100d of FIG. 32), the home appliance (100e of FIG. 32), the IoT device (100f of FIG. 32), a digital broadcast terminal, a hologram device, a public safety device, an MTC device, a medicine device, a fintech device (or a finance device), a security device, a climate/environment device, the AI server/device (400 of FIG. 32), the BSs (200 of FIG. 32), a network node, etc. The wireless device may be used in a mobile or fixed place according to a use-example/service.

In FIG. 34, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. X3 will be described in detail with reference to the drawings.

6.1. Example of Portable Device to which the Present Disclosure is Applied

Figure 35:
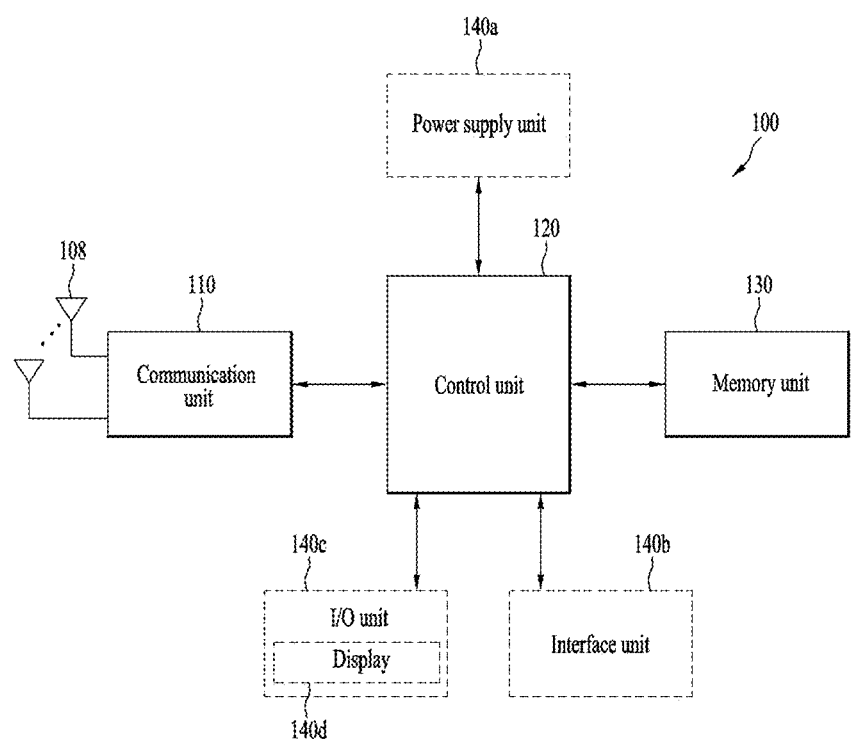
FIG. 35 illustrates a hand-held device applied to the present disclosure.

FIG. 35 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 35, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 34, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 36:
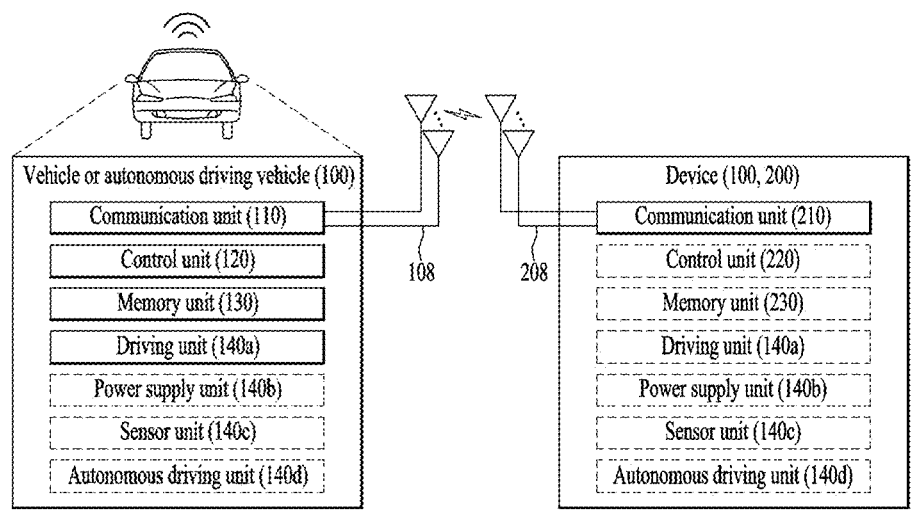
FIG. 36 illustrates a vehicle or an autonomous driving vehicle applied to the present disclosure.

6.2. Example of Vehicle or Autonomous Driving Vehicle to which the Present Disclosure is Applied FIG. 36 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. X5, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 34, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band. Further, the proposed methods may be applied to a vehicle communication system or autonomous driving system to which the afore-described wireless access system is applied.

What is claimed is:

1. A method performed by a user equipment (UE) in a wireless communication system, the method comprising:
   receiving a first synchronization signal block (SSB);
   receiving a second SSB;
   detecting a first demodulation reference signal (DMRS) sequence for a first physical broadcast channel (PBCH) included in the first SSB; and
   detecting a second DMRS sequence for a second PBCH included in the second SSB,
   wherein, based on that a first operation value related to a first index of the first DMRS sequence and a second operation value related to a second index of the second DMRS sequence are identical, an index of the first SSB and an index of a second SSB are identical, and
   wherein the method further comprises performing initial access with a base station (BS) based on (i) one of the first DMRS sequence and the second DMRS sequence and (ii) the first SSB and the second SSB.

2. The method of claim 1,
   wherein the first operation value and the second operation value are result values of a modulo operation for the first index and the second index, respectively.

3. The method of claim 1,
   wherein a number of candidate positions for the first SSB and the second SSB and a number of bits for a PBCH payload of the first PBCH and a PBCH payload of the second PBCH are determined differently based on a subcarrier spacing (SCS).

4. The method of claim 3,
   wherein based on the SCS being 15 kHz, the number of bits for the PBCH payload of the first PBCH and the PBCH payload of the second PBCH is 1, and
   wherein based on the SCS being 30 kHz, the number of bits for the PBCH payload of the first PBCH and the PBCH payload of the second PBCH is 2.

5. The method of claim 1, wherein the first DMRS sequence and the second DMRS sequence are detected by blind-detection by the UE, and
   wherein a PBCH payload of the first PBCH is decoded based on the first DMRS sequence, and wherein a PBCH payload of the second PBCH is decoded based on the second DMRS sequence.

6. The method of claim 1, wherein the first SSB is received at one of a plurality of candidate positions available for transmission of the first SSB in an unlicensed band.

7. A user equipment (UE) configured to operate in a wireless communication system, the UE comprising:
   at least one radio frequency (RF) module;
   at least one processor; and
   at least one computer memory operably connectable to the at least one processor and storing instructions that, when executed by the at least one processor, perform operations comprising:
   receiving a first synchronization signal block (SSB);
   receiving a second SSB;
   detecting a first demodulation reference signal (DMRS) sequence for a first physical broadcast channel (PBCH) included in the first SSB; and
   detecting a second DMRS sequence for a second PBCH included in the second SSB,
   wherein, based on that a first operation value related to a first index of the first DMRS sequence and a second operation value related to a second index of the second DMRS sequence are identical, an index of the first SSB and an index of a second SSB are identical, and
   wherein the operations further comprise performing initial access with a base station (BS) based on (i) one of the first DMRS sequence and the second DMRS sequence and (ii) the first SSB and the second SSB.

8. The UE of claim 7,
   wherein a number of candidate positions for the first SSB and the second SSB and a number of bits for a PBCH payload of the first PBCH and a PBCH payload of the second PBCH are determined differently based on a subcarrier spacing (SCS).

9. The UE of claim 8,
   wherein based on the SCS being 15 kHz, the number of bits for the PBCH payload of the first PBCH and the PBCH payload of the second PBCH is 1, and
   wherein based on the SCS being 30 kHz, the number of bits for the PBCH payload of the first PBCH and the PBCH payload of the second PBCH is 2.

10. The UE of claim 7, wherein the first DMRS sequence and the second DMRS sequence are detected by blind-detection by the UE, and
    wherein a PBCH payload of the first PBCH is decoded based on the first DMRS sequence, and wherein a PBCH payload of the second PBCH is decoded based on the second DMRS sequence.

11. The UE of claim 7, wherein the first SSB is received at one of a plurality of candidate positions available for transmission of the first SSB in an unlicensed band.

12. A base station (BS) configured to operate in a wireless communication system, the BS comprising:
    at least one radio frequency (RF) module;
    at least one processor; and at least one computer memory operably connectable to the at least one processor and storing instructions that, when executed by the at least one processor, perform operations comprising:

performing a first channel access procedure (CAP) for transmission of a first synchronization signal block (SSB); and transmitting the first SSB to a user equipment (UE) based on the first CAP, performing a second CAP for transmission of a second synchronization signal block (SSB); and transmitting the second SSB to the UE based on the second CAP, and wherein the first SSB includes a first physical broadcast channel (PBCH) and the second SSB includes a second PBCH, wherein, based on that a first operation value related to a first index of a first demodulation reference signal (DMRS) sequence for the first PBCH and a second operation value related to a second index of a second DMRS sequence for the second PBCH are identical, an index of the first SSB and an index of a second SSB are identical, and wherein the operations further comprise providing initial access to the UE based on (i) one of the first DMRS sequence and the second DMRS sequence and (ii) the first SSB and the second SSB.

13. The BS of claim 12, wherein the operations further comprise:

transmitting the first SSB to the UE at one of a plurality of candidate positions available for transmission of the first SSB based on the first CAP.

14. The BS of claim 12, wherein the first operation value and the second operation value are result values of a modulo operation for the first index and the second index, respectively.

15. The BS of claim 12, wherein a number of candidate positions for the first SSB and the second SSB and a number of bits for a PBCH payload of the first PBCH and a PBCH payload of the second PBCH are determined differently based on a subcarrier spacing (SCS).

16. The BS of claim 15, wherein based on the SCS being 15 kHz, the number of bits for the PBCH payload of the first PBCH and the PBCH payload of the second PBCH is 1, and wherein based on the SCS being 30 kHz, the number of bits for the PBCH payload of the first PBCH and the PBCH payload of the second PBCH is 2.

17. The BS of claim 12, wherein the first operation value and the second operation value are result values of a modulo operation for the first index and the second index, respectively.

* * * * *